(12) United States Patent
Hotta et al.

(10) Patent No.: US 12,452,563 B2
(45) Date of Patent: Oct. 21, 2025

(54) SOLID-STATE IMAGING DEVICE, METHOD FOR DRIVING SOLID-STATE IMAGING DEVICE, AND ELECTRONIC APPARATUS

(71) Applicants: Brillnics Singapore Pte. Ltd., Singapore (SG); THE RITSUMEIKAN TRUST, Kyoto (JP)

(72) Inventors: Ryotaro Hotta, Kusatsu (JP); Shunsuke Okura, Kusatsu (JP); Ken Miyauchi, Tokyo (JP); Hideki Owada, Tokyo (JP); Sangman Han, Tokyo (JP); Isao Takayanagi, Tokyo (JP)

(73) Assignees: BRILLNICS SINGAPORE PTE. LTD., Singapore (SG); THE RITSUMEIKAN TRUST, Kyoto (JP)

( * ) Notice: Subject to any disclaimer, the term of this patent is extended or adjusted under 35 U.S.C. 154(b) by 39 days.

(21) Appl. No.: 18/646,263

(22) Filed: Apr. 25, 2024

(65) Prior Publication Data

US 2024/0365027 A1    Oct. 31, 2024

(30) Foreign Application Priority Data

Apr. 25, 2023   (JP) .................... 2023-071507

(51) Int. Cl.
*H04N 25/78*   (2023.01)
*H04N 25/59*   (2023.01)
*H04N 25/772*  (2023.01)
*H04N 25/778*  (2023.01)

(52) U.S. Cl.
CPC .............. *H04N 25/78* (2023.01); *H04N 25/59* (2023.01); *H04N 25/772* (2023.01); *H04N 25/778* (2023.01)

(58) Field of Classification Search
None
See application file for complete search history.

(56) References Cited

U.S. PATENT DOCUMENTS

2008/0266434 A1    10/2008   Sugawa et al.
2020/0236318 A1*   7/2020    Okura .................... H04N 25/57
2022/0408047 A1    12/2022   Okura et al.

FOREIGN PATENT DOCUMENTS

JP   2005-328493 A   11/2005
JP   2020-115603 A   7/2020
JP   2023-001516 A   1/2023

* cited by examiner

*Primary Examiner* — Mark T Monk
(74) *Attorney, Agent, or Firm* — Pillsbury Winthrop Shaw Pittman LLP

(57) ABSTRACT

In a pixel signal processing part, a first input switch and an output switch are turned on and off in phase. When the first input switch and the output switch are ON and the second input switch is OFF, a first auto-zero switch and a second auto-zero switch are kept in the ON state to connect the second node to the reference potential (GND), so that a sampling capacitor, a feedback capacitor, and an auto-zero capacitor are operated in respective operation ranges of the capacitors, and the feedback capacitor is kept constant according to a difference of the input pixel signals, thereby making the output of the amplifier in linear response to the input signal.

16 Claims, 19 Drawing Sheets

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2023-071507 (filed on Apr. 25, 2023), the contents of which are hereby incorporated by reference in its entirety.

TECHNICAL FIELD

The present disclosure relates to a rotation mechanism and a robot.

BACKGROUND

Solid-state imaging devices (image sensors) including photoelectric conversion elements for detecting light and generating charges are embodied as complementary metal oxide semiconductor (CMOS) image sensors, which have been in practical use. The CMOS image sensors have been widely applied in various types of electronic apparatuses such as digital cameras, video cameras, surveillance cameras, medical endoscopes, personal computers (PCs), mobile phones and other portable terminals (mobile devices) as their parts.

The CMOS image sensors include, for each pixel, a photodiode (a photoelectric conversion element) and a floating diffusion (FD) amplifier having a floating diffusion (FD). The mainstream design of the read-out operation in the CMOS image sensors is a column parallel output processing performed by selecting a row in a pixel array and reading the pixels simultaneously in the column direction.

The solid-state imaging devices (CMOS image sensors) can be constituted by, for example, basic 4-transistor (4Tr) pixels. The 4Tr pixels each include, for one photodiode (photoelectric conversion element), one transfer transistor serving as a transfer element, one reset transistor serving as a reset element, one source follower transistor serving as a source follower element and one selection transistor serving as a selection element.

The transfer transistor remains selected and in the conduction state during a predetermined transfer period to transfer to the floating diffusion FD the charges (electrons) produced by the photoelectric conversion and then stored in the photodiode. The reset transistor remains selected and in the conduction state during a predetermined reset period to reset the floating diffusion FD to the potential of a power supply line. The selection transistor remains selected and in the conduction state during a read-out scan. Thus, the source follower transistor outputs, to the vertical signal line, a read-out signal of a column output generated by the conversion performed by the floating diffusion FD to a voltage signal.

For example, in a read-out scan period, the floating diffusion FD is reset to the potential of the power supply line (the reference potential) in a reset period, the charges in the floating diffusion FD are then converted into a voltage signal with a gain corresponding to the FD capacitance, and the voltage signal is output to the vertical signal line as a read-out reset signal Vrst of the reference level (a signal of the reference level). Subsequently, in a transfer period, the charges (electrons) produced by the photoelectric conversion and then stored in the photodiode are transferred to the floating diffusion FD. The charges of the floating diffusion FD are converted into a voltage signal with a gain corresponding to the FD capacitance, and the voltage signal is output to the vertical signal line as a read-out signal Vsig of the signal level (a signal of the signal level). The output signals from the pixel are subjected to the CDS (correlated double sampling) process in the form of a differential signal (Vsig-Vrst) in a column reading circuit.

As described above, an ordinary pixel read-out signal (hereinafter also referred to as "pixel signal") PS includes one read-out reset signal Vrst of the reference level and one read-out signal Vsig of the signal level.

To improve characteristics, various methods have been proposed for fabricating solid-state imaging devices (CMOS image sensors) that have a high dynamic range (HDR) and provides a high picture quality.

As one of the approaches applied to increase the dynamic range, a lateral overflow integration capacitor (LOFIC) can be proposed (see, for example, Japanese Patent Application Publication No. 2005-328493). When having the LOFIC configuration, the pixels have a storage capacitor and a storage transistor in addition to the above-listed basic constituents, so that overflow charges overflowing from the photodiode within the same exposure period are not wasted but stored in the storage capacitor.

The LOFIC pixel can have two types of conversion gains: the conversion gain determined by the capacitance Cfd1 of the floating diffusion (high gain: proportional to 1/Cfd1); and the conversion gain determined by the sum of the capacitance Cfd1 of the floating diffusion and the LOFIC capacitance Clofic of the storage capacitor C2 (low gain: proportional to 1/(Cfd1+Clofic)). In other words, the LOFIC pixels can achieve high full well capacity and low dark noise using low conversion gain (LCG) signals and high conversion gain (HCG) signals.

The LOFIC architecture, however, has serious issues, or faces a reduced SNR at the conjunction (combination) point of a high conversion gain (HCG) signal and a low conversion gain (LCG) signal. More specifically, the LOFIC architecture alone can not remove kTC noise of the LCG signal, which results in a lower SNR at the conjunction point between the HCG signal and the LCG signal.

For example, although not intended for the LOFIC architecture, Japanese Patent Application Publication No. 2020-115603 ("the '603 Publication") proposes a specific circuit configuration of a pixel signal processing part in a reading circuit of a solid-state imaging device that is capable of removing noise gap at the conjunction point between low-conversion-gain data and high-conversion-gain data, preventing an increase in power consumption and circuit area and additionally achieving a high dynamic range.

The CMOS image sensor having the LOFIC architecture requires a dual reading circuit since the high-conversion-gain (HCG) signal and the low-conversion-gain (LGC) signal have opposite signal directions, more specifically, opposite level-transitioning directions. The pixel signal processing unit in the reading circuit disclosed in the '603 Publication, however, is capable of reading both the HCG signal and LCG signal generated by the single-exposure HDR (SEHDR) pixel having the same signal direction and thus can not be applied to CMOS image sensors having the LOFIC architecture.

In addition, to realize a dual reading circuit compatible with CMOS image sensors with LOFIC structure, a reading circuit that can process both LCG and HCG signals with minimal circuit overhead and low power consumption is desired to reduce the chip cost.

In view of the above, Japanese Patent Application Publication No. 2023-001516 ("the '516 Publication") proposes a CMOS image sensor (solid-state imaging device) that is capable of reading signals produced with different conversion gains and different signal directions, but preventing an increase in power consumption and circuit area, providing a high dynamic range, and high image quality is thus achieved.

In CMOS image sensors, column-parallel circuits are often used as described above. In these column-parallel circuits, MOS capacitors with large unit capacitance are preferably used in order to implement many column circuits in a small area. However, the capacitance of MOS capacitors depends on voltage, which causes nonlinearities in column amplifiers in a normal CMOS process. For example, in the LOFIC reading circuit described above, the amplifiers exhibit nonlinear input-output characteristics. Therefore, in order to give the circuit a linear input-output characteristic, it is required to adopt a linear capacitor that has been subjected to an additional costly process.

The circuit described in the '516 Publication is capable of reading both the HCG and LCG signals generated from LOFIC pixels. However, this circuit still exhibits nonlinear input-output characteristics since this circuit uses MOS capacitors without the additional process in order to reduce cost. Therefore, it is difficult for the circuits of the '516 Publication to sufficiently prevent an increase in power consumption and circuit area, reduce the chip cost, provide a high dynamic range, and achieve a high image quality.

SUMMARY

An object of the present disclosure is to provide a solid-state imaging device, a method for driving a solid-state imaging device, and an electronic apparatus that are capable of not only reading signals produced with different conversion gains and having different signal directions but also improving the input-output linearity, preventing an increase in power consumption and circuit area, reducing the chip cost, providing a high dynamic range, and thus achieving high image quality.

A solid-state imaging device according to one aspect of the disclosure includes readable pixel adapted to produce a plurality of read-out signals as a pixel signal, each of the plurality of read-out signals being formed of a signal at a reference level and a signal at a signal level; a pixel signal processing part for processing the pixel signal read out from the readable pixel, wherein the pixel signal processing part includes: an input node for receiving the pixel signal read out from the readable pixel input thereto; a connection node connected to a next-stage circuit; an operational amplifier having an inverting input terminal and a non-inverting input terminal; a first node connected to the non-inverting input terminal of the operational amplifier; a second node; a third node connected to an output terminal of the operational amplifier and the connection node; a first auto-zero switch connected between the third node and the first node; an auto-zero capacitor connected between the first node and the second node; a second auto-zero switch connected between the second node and a predetermined bias potential, the second auto-zero switch being turned on and off in phase with the first auto-zero switch; a feedback capacitor connected between the third node and the second node; and a sampling capacitor connected between the second node and the input node, wherein the first auto-zero switch and the second auto-zero switch are kept in ON state during an auto-zero period including a reset function.

According to a second aspect of the disclosure, provided is a method of driving a solid-state imaging device. The solid-state imaging device includes: readable pixel adapted to produce a plurality of read-out signals as a pixel signal, each of the plurality of read-out signals being formed of a signal at a reference level and a signal at a signal level; and a pixel signal processing part for processing the pixel signal read out from the readable pixel, wherein the pixel signal processing part includes: an input node for receiving the pixel signal read out from the readable pixel input thereto; a connection node connected to a next-stage circuit; an operational amplifier having an inverting input terminal and a non-inverting input terminal; a first node connected to the non-inverting input terminal of the operational amplifier; a second node; a third node connected to an output terminal of the operational amplifier and the connection node; a first auto-zero switch connected between the third node and the first node; an auto-zero capacitor connected between the first node and the second node; a second auto-zero switch connected between the second node and a predetermined bias potential, the second auto-zero switch being turned on and off in phase with the first auto-zero switch; a feedback capacitor connected between the third node and the second node; and a sampling capacitor connected between the second node and the input node, wherein the first auto-zero switch and the second auto-zero switch are kept in ON state during an auto-zero period including a reset function. The method includes: operating the sampling capacitor, the feedback capacitor, and the auto-zero capacitor in respective operation ranges of the capacitors by holding the first auto-zero switch and the second auto-zero switch in ON state to connect the second node to the bias potential; and making output of the operational amplifier in linear response to an input signal by keeping the feedback capacitor constant according to a difference of the input pixel signal.

An electronic apparatus according to a third aspect of the disclosure includes: a solid-state imaging device; and an optical system for forming a subject image on the solid-state imaging device, wherein the solid-state imaging device includes: readable pixel adapted to produce a plurality of read-out signals as a pixel signal, each of the plurality of read-out signals being formed of a signal at a reference level and a signal at a signal level; and a pixel signal processing part for processing the pixel signal read out from the readable pixel, wherein the pixel signal processing part includes: an input node for receiving the pixel signal read out from the readable pixel input thereto; a connection node connected to a next-stage circuit; an operational amplifier having an inverting input terminal and a non-inverting input terminal; a first node connected to the non-inverting input terminal of the operational amplifier; a second node; a third node connected to an output terminal of the operational amplifier and the connection node; a first auto-zero switch connected between the third node and the first node; an auto-zero capacitor connected between the first node and the second node; a second auto-zero switch connected between the second node and a predetermined bias potential, the second auto-zero switch being turned on and off in phase with the first auto-zero switch; a feedback capacitor connected between the third node and the second node; and a sampling capacitor connected between the second node and the input node, wherein the first auto-zero switch and the second auto-zero switch are kept in ON state during an auto-zero period including a reset function.

Advantageous Effects

According to the aspects of the disclosure, signals produced with different conversion gains and having different signal directions can be read, but also the input-output linearity can be improved, an increase in power consumption and circuit area can be prevented, the chip cost can be reduced, a high dynamic range can be provided, and thus high image quality can be thus achieved.

DESCRIPTION OF THE EMBODIMENTS

Embodiments of the present disclosure will be hereinafter described with reference to the drawings.

First Embodiment

Figure 1:
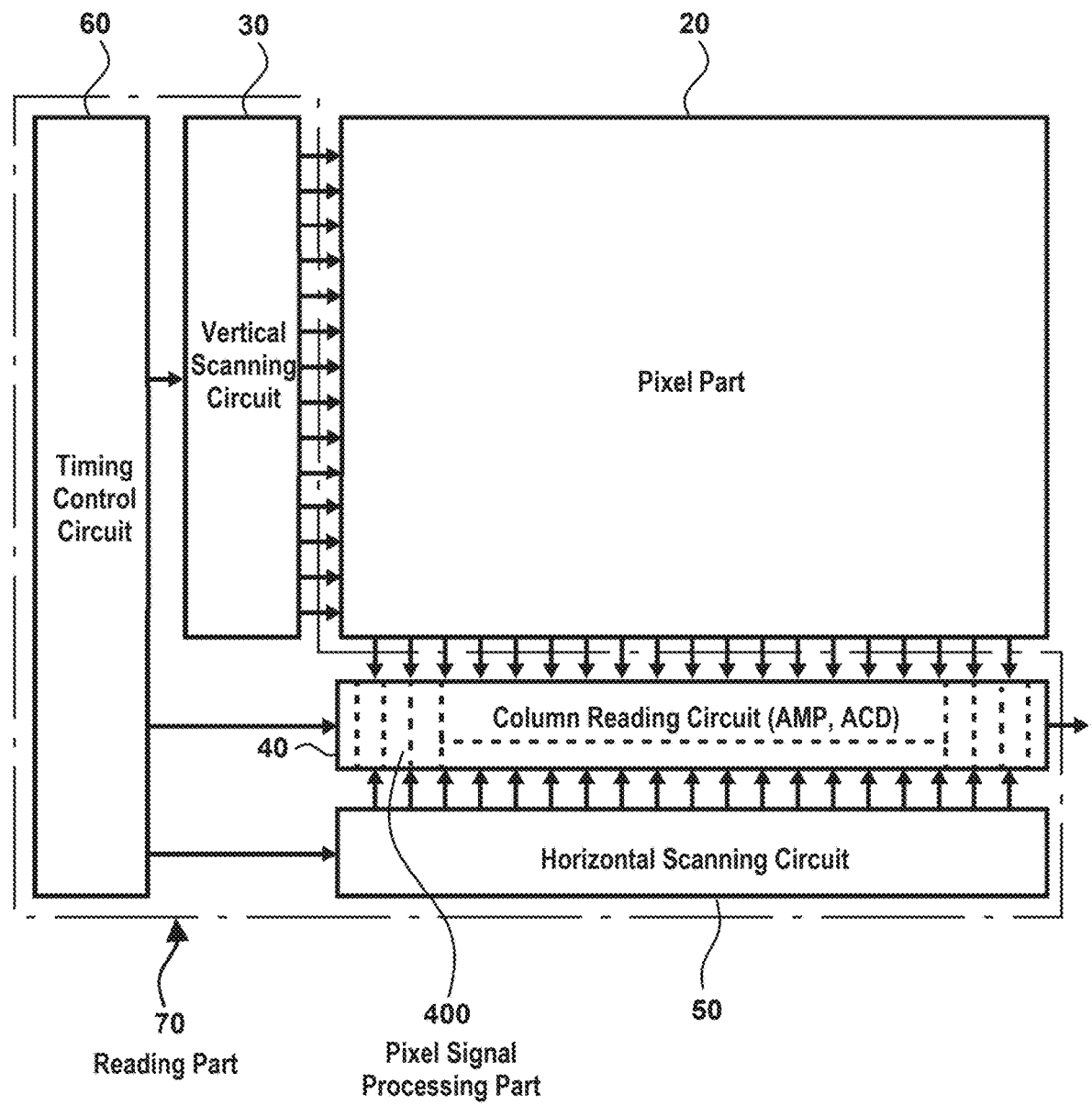
FIG. 1 is a block diagram showing an example configuration of a solid-state imaging device relating to a first embodiment of the present disclosure.
Figure 2:
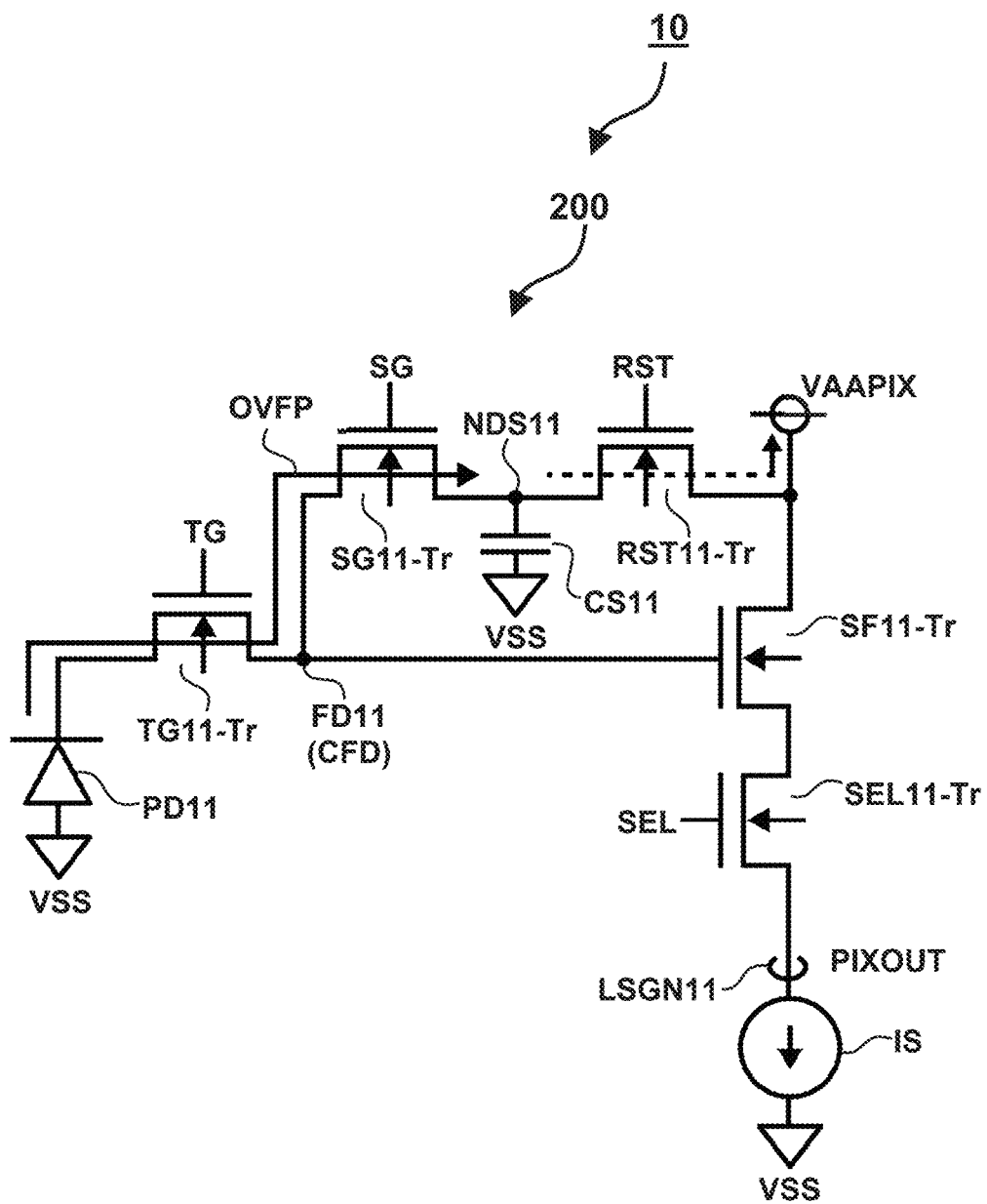
FIG. 2 is a circuit diagram showing an example configuration of a to-be-read pixel of a solid-state imaging device relating to the first embodiment of the present disclosure.
Figure 3:
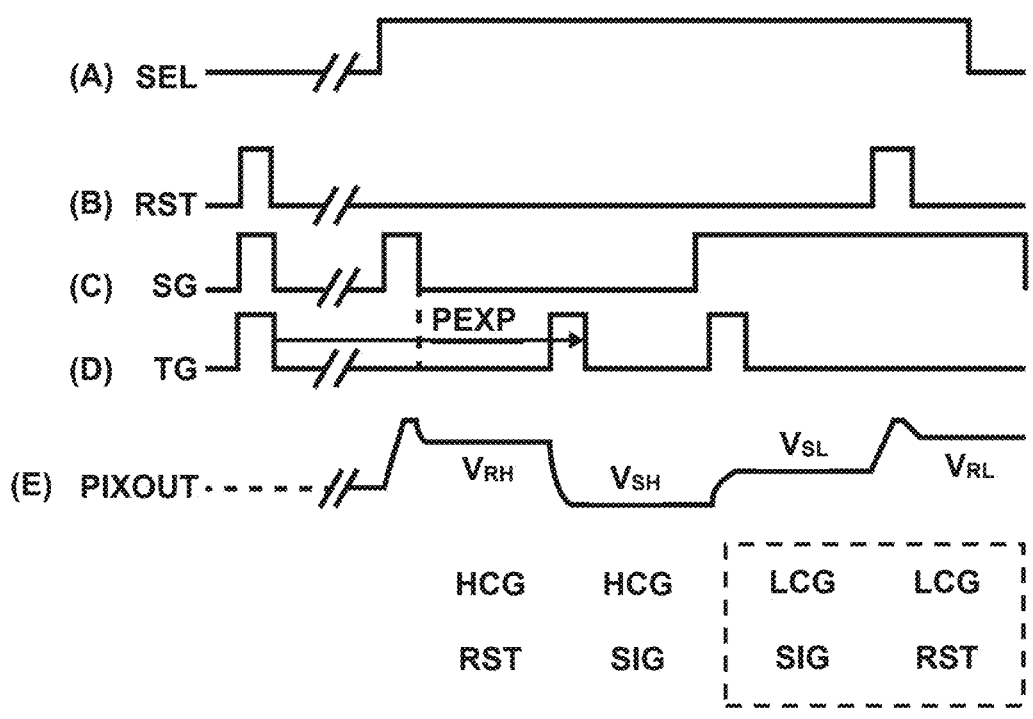
FIG. 3 is a timing chart to illustrate an example sequence of operations for reading performed on the readable pixel in the solid-state imaging device relating to the first embodiment of the present disclosure.

FIG. 1 is a block diagram showing an example configuration of a solid-state imaging device relating to a first embodiment of the present disclosure. FIG. 2 is a circuit diagram showing an example configuration of a readable pixel of the solid-state imaging device relating to the first embodiment of the present disclosure. FIG. 3 is a timing chart including parts (A) to (E) to illustrate an example sequence of operations for reading performed on the readable pixel in the solid-state imaging device relating to the first embodiment of the present disclosure.

In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40 including a pixel signal processing part 400, a horizontal scanning circuit (a column scanning circuit) 50, and a timing control circuit 60. Among these components, for example, the vertical scanning circuit 30, the reading circuit 40, the horizontal scanning circuit 50, and the timing control circuit 60 constitute a reading part 70 for reading out pixel signals.

In the first embodiment, readable pixels 200 are arranged in a matrix pattern in the pixel part 20, and each readable pixel 200 is basically configured as shown in FIG. 2. More specifically, the readable pixel 200 includes: a floating diffusion FD 11 storing therein the to-be-transferred charges so that the charges can be read in the form of a voltage signal; a photodiode PD11 serving as a photoelectric conversion element for storing, in an exposure period PEXP, therein the charges determined by the amount of incident light; a transfer transistor TG11-Tr serving as a transfer element for transferring to the floating diffusion FD11 the charges stored in the photodiode PD11 serving as the photoelectric conversion element, where the transfer transistor TG11-Tr remains in a non-conduction state during the exposure period PEXP and remains in a conduction state during a transfer period; and a reset transistor RST11-Tr serving as a reset element for performing a reset operation of discharging the charges stored in the floating diffusion FD11.

The readable pixel 200 further includes: a storage capacitor CS11 serving as a storage capacitance element for storing therein overflow charges overflowing from the photodiode PD11 serving as the photoelectric conversion element; and a storage transistor SG11-Tr serving as the storage connection element to selectively connect the floating diffusion FD11 and the storage capacitor CS11 serving as the storage capacitance element.

In addition, the readable pixel 200 includes an overflow path OVFP for allowing the charges, which overflow from the photodiode PD11 serving as the photoelectric conversion element toward the floating diffusion FD11 through the transfer transistor TG11-Tr, to overflow toward the region where the storage capacitor CS11 serving as a charge capacitance element is formed. The storage capacitor CS11 is connected between a storage node NDS11 formed in a predetermined region in the overflow path OVFP and a reference potential VSS, a storage transistor SG11-Tr is connected between the storage node NDS11 and the floating diffusion FD11, and the reset transistor RST11-Tr is connected between a power supply potential VAAPIX and the storage node NDS11. The readable pixel 200 further includes a source follower transistor SF11-Tr serving as a source follower element for outputting the voltage signal produced by the conversion by the floating diffusion FD11 and a selection transistor SEL11-Tr serving as a selection element.

The readable pixel 200 relating to the present embodiment is configured to, under control of the reading part 70, change the capacitance of the floating diffusion FD11 between a first capacitance and a second capacitance to change the conversion gain between a first conversion gain (for example, high conversion gain: HCG) corresponding to the first capacitance and a second conversion gain (for example, low conversion gain: LCG) corresponding to the second capacitance, by selectively connecting the floating diffusion FD11 to the storage capacitor CS11 serving as the storage capacitance element through the storage transistor SG11-Tr serving as a storage connection element.

As described above, the solid-state imaging device 10 is configured to perform, under control of the reading part 70, first conversion gain mode read-out and second conversion gain mode read-out in a designated dual conversion gain read-out mode period as shown in FIG. 3. In the first conversion gain mode read-out, pixel signals are read with the first conversion gain (high conversion gain (HCG)) corresponding to the first capacitance, and in the second conversion gain mode read-out, pixel signals are read with the second conversion gain (low conversion gain: LCG) corresponding to the second capacitance (different from the first capacitance).

The readable pixel 200 has, for example, a lateral overflow integration capacitor (LOFIC), so that a dual-sampling read-out mode (LOFIC mode) operation can be performed in a high illuminance circumstance under control of the reading part 70. In the LOFIC mode operation, the second conversion gain is used, which is related to the charges stored in the photodiode PD11 serving as the photoelectric conversion element and the overflow charges.

The readable pixel 200 relating to the first embodiment can be subject to the dual conversion gain signal read-out involving the first conversion gain signal read-out according to which the pixel signals are read with the first conversion gain (for example, high conversion gain: HCG) corresponding to the first capacitance and the second conversion gain signal read-out according to which the pixel signals are read with the second conversion gain (for example, the low conversion gain: LCG) corresponding to the second capacitance (different from the first capacitance). In the first embodiment, the read-out operation for the readable pixel 200 involves, in a first conversion gain signal read-out mode, reading a first read-out reset signal HCGRST and subsequently a first read-out luminance signal HCGSIG, as shown in FIG. 3. In a subsequent second conversion gain signal read-out mode, a second read-out luminance signal LCGSIG and a second read-out reset signal LCGRST are sequentially read out.

Accordingly, the first conversion gain signal (HCGRST, HCGSIG) and the second conversion gain signal (LCGSIG, LCGRST) read out as the pixel signal PXLOUT from the readable pixel 200 have opposite signal directions (opposite level transitioning directions).

<Specific Circuit Configuration of Pixel 200>

The following now specifically describes the circuit configuration of the readable pixel 200 shown in FIG. 2. In the following description, the readable pixel 200 has an LOFIC configuration, for example.

In the pixel part 20, the readable pixels 200 each including a photodiode (photoelectric conversion element) and an in-pixel amplifier are arranged in a two-dimensional matrix comprised of N rows and M columns.

The readable pixel 200 includes, for example as shown in FIG. 2: the photodiode PD11 serving as the photoelectric conversion element; the transfer transistor TG11-Tr serving as the transfer element; the reset transistor RST11-Tr serving as the reset element; the source follower transistor SF11-Tr serving as the source follower element; the selection transistor SEL11-Tr serving as the selection element; the storage transistor SG11-Tr serving as the storage connection element; the storage capacitor CS11 serving as the storage capacitance element; the floating diffusion FD11; and the storage node NDS11 connected to the storage capacitor CS11.

In the readable pixel 200, the capacitance CFD of the floating diffusion FD11 is very small for achieving a low noise. The capacitance CS1 of the storage capacitor CS11 is very large (electrostatic capacitance) for achieving a high full well capacity (FWC). The capacitance CS1 of the storage capacitor CS11 is greater than the capacitance CFD of the floating diffusion FD11. The capacitance CFD of the floating diffusion FD11 is mainly used for the high conversion gain, and the capacitance CS1 of the storage capacitor CS11 is additionally used for the low conversion gain.

The photodiode PD11 generates signal charges (electrons) in an amount determined by the amount of the incident light and stores the same. A description will be hereinafter given of a case where the signal charges are electrons and each transistor is an n-type transistor. However, it is also possible that the signal charges are holes or each transistor is a p-type transistor.

In each readable pixel 200, the photodiode (PD) is a pinned photodiode (PPD). The substrate surface for forming the photodiode (PD) has a surface level due to dangling bonds or other defects. Therefore, a lot of charges (dark current) are generated due to heat energy, as a result of which the signals fail to be read out correctly. The pinned photodiodes (PPDs) have the charge storage part buried in the substrate, thereby reducing mixing of the dark current into the signals.

The transfer transistor TG11-Tr is connected between the photodiode PD11 and the floating diffusion FD11 and controlled through a control signal TG. The transfer transistor TG11-Tr remains selected and in the conduction state during a period in which the control signal TG is at the high (H) level, to transfer to the floating diffusion FD11 the charges (electrons) produced by photoelectric conversion by the photodiode PD11 and then stored in the storage node.

In the example shown in FIG. 2, the reset transistor RST11-Tr is connected between the power supply potential VAAPIX and the storage node NDS11 and controlled through a control signal RST. The reset transistor RST11-Tr remains selected and in the conduction state during a period in which the control signal RST is at the H level, to reset the floating diffusion FD11 (and the storage capacitor CS11) to the power supply potential VAAPIX when the storage transistor SG11-Tr is in the conduction state.

In the first embodiment, the reset transistor RST11-T, the storage transistor SG11-Tr and the transfer transistor TG11-Tr remain in the conduction state, so that the floating diffusion FD11 and the photodiode PD11 are reset. In the first embodiment, the reset transistor RST11-Tr and the storage transistor SG11-Tr remain in the conduction state, so that the floating diffusion FD11 and the storage capacitor CS11 are reset.

The storage transistor SG11-Tr is connected between the floating diffusion FD11 and the storage capacitor CS11 (and the reset transistor RST11-Tr) via the storage node NDS11. The storage transistor SG11-Tr is controlled by a control signal SG applied to the gate thereof through a control line. The storage transistor SG11-Tr remains selected and in the conduction state during a period in which the control signal SG is at the H level, to connect the floating diffusion FD11 and the storage capacitor CS11 (and the reset transistor RST11-Tr). In the first embodiment, the reset transistor RST11-Tr and the storage transistor SG11-Tr remain in the conduction state, so that the floating diffusion FD11 and the storage capacitor CS11 are reset, as mentioned above.

In the first embodiment, the overflow path OVFP is, as shown in FIG. 2, formed so as to allow the overflow charges of the photodiode PD11 to be transferred to the storage capacitor CS11 through the floating diffusion FD11, the storage transistor SG11-Tr, the storage node NDS11 (as indicated by the solid arrow), and also formed so as to allow the overflow charges of the storage capacitor CS11 to be transferred to the power supply potential VAAPIX through the storage node NDS11 and the reset transistor RST11-Tr (as indicted by the dotted arrow).

The source follower transistor SF11-Tr and the selection transistor SEL11-Tr are connected in series between the power supply potential VAAPIX and the vertical signal line LSGN11. The gate of the source follower transistor SF11-Tr is connected to the floating diffusion FD11, and the selection transistor SEL11-Tr is controlled by a control signal SEL applied to the gate thereof through a control line. The selection transistor SEL11-Tr remains selected and in the conduction state during a selection period in which the control signal SEL is at the H level. In this way, the source follower transistor SF11-Tr outputs, to the vertical signal line LSGN11, a read-out voltage signal (VRST1, VSIG1) of a column output, which is a voltage signal produced through the conversion performed by the floating diffusion FD11.

Since the pixel part 20 includes the readable pixels 200 arranged in N rows and M columns, N control lines are provided for each of the control signals, and M vertical signal lines are provided. In FIG. 1, the control lines for each row are represented as one row-scanning control line.

The vertical scanning circuit 30 drives the pixels in shutter and read-out rows through the row-scanning control lines under control of the timing control circuit 60. Further, the vertical scanning circuit 30 outputs, according to address signals, row selection signals for row addresses of the reading rows from which signals are read out and the shutter rows in which the charges stored in the photodiodes PD11 are reset.

The reading circuit 40 includes a plurality of pixel signal processing parts 400, which are a plurality of column signal processing circuits (not shown) arranged corresponding to the column outputs of the pixel part 20, and the reading circuit 40 may be configured such that the plurality of column signal processing circuits can perform column parallel processing. In the reading circuit 40, the pixel signal processing parts 400 are capable of inverting one of the first-conversion-gain signal (HCGRST, HCGSIG) and the second-conversion-gain signal (LCGSIG, LCGRST), which have opposite signal directions or opposite level transitioning directions and are read out as the pixel signal PXLOUT from the readable pixels 200, specifically, the first-conversion-gain signal. The pixel signal processing parts 400 are further capable of, after aligning their signal directions (signal transitioning directions), analog-to-digital (AD) converting the first- and second-conversion-gain signals. The specific example circuit configuration of the pixel signal processing parts will be described below in detail.

The horizontal scanning circuit 50 scans the signals processed in the plurality of pixel signal processing parts 400 of the reading circuit 40, transfers the signals in a horizontal direction, and outputs the signals to a signal processing circuit (not shown).

The timing control circuit 60 generates timing signals required for signal processing in the pixel part 20, the vertical scanning circuit 30, the reading circuit 40, the horizontal scanning circuit 50, and the like.

When the dual conversion gain reading mode MDCG is designated, the reading part 70 performs a first conversion gain reset read-out operation HCGRRD, a first conversion gain read-out operation HCGRRD, a second conversion gain read-out operation LCGSRD, and a second conversion gain reset read-out operation LCGRRD.

In the first embodiment, the reading part 70 performs, after an exposure period PEXP starts, a read-out operation in the dual conversion gain read-out mode MDCG.

For example, the reading part 70 controls the reset transistor RST11-Tr, the storage transistor SG11-Tr and the transfer transistor TG11-Tr to remain in the conduction state for a predetermined period of time, so that the photodiode PD11, the floating diffusion FD11 and the storage capacitor CS11 are reset to perform a shutter operation, and controls the transfer transistor TG11-Tr to remain in the non-conduction state to start the exposure period PEXP, as shown in FIG. 3. After the exposure period PEXP starts, the reading part 70 operates in the dual conversion gain reading mode DMCG, specifically, sequentially performs a first conversion gain reset read-out operation HCGRRD, a first conversion gain read-out operation HCGSRD, a second conversion gain read-out operation LCGSRD, and a second conversion gain reset read-out operation LCGRRD.

The above description has outlined the configurations and functions of the parts of the solid-state imaging device 10. Next, a description will be hereinafter given of details of configuration of the amplifying parts in the column signal processing parts serving as a column processing system of the reading part 70 relating to the first embodiment and a reading process related thereto.

Figure 4:
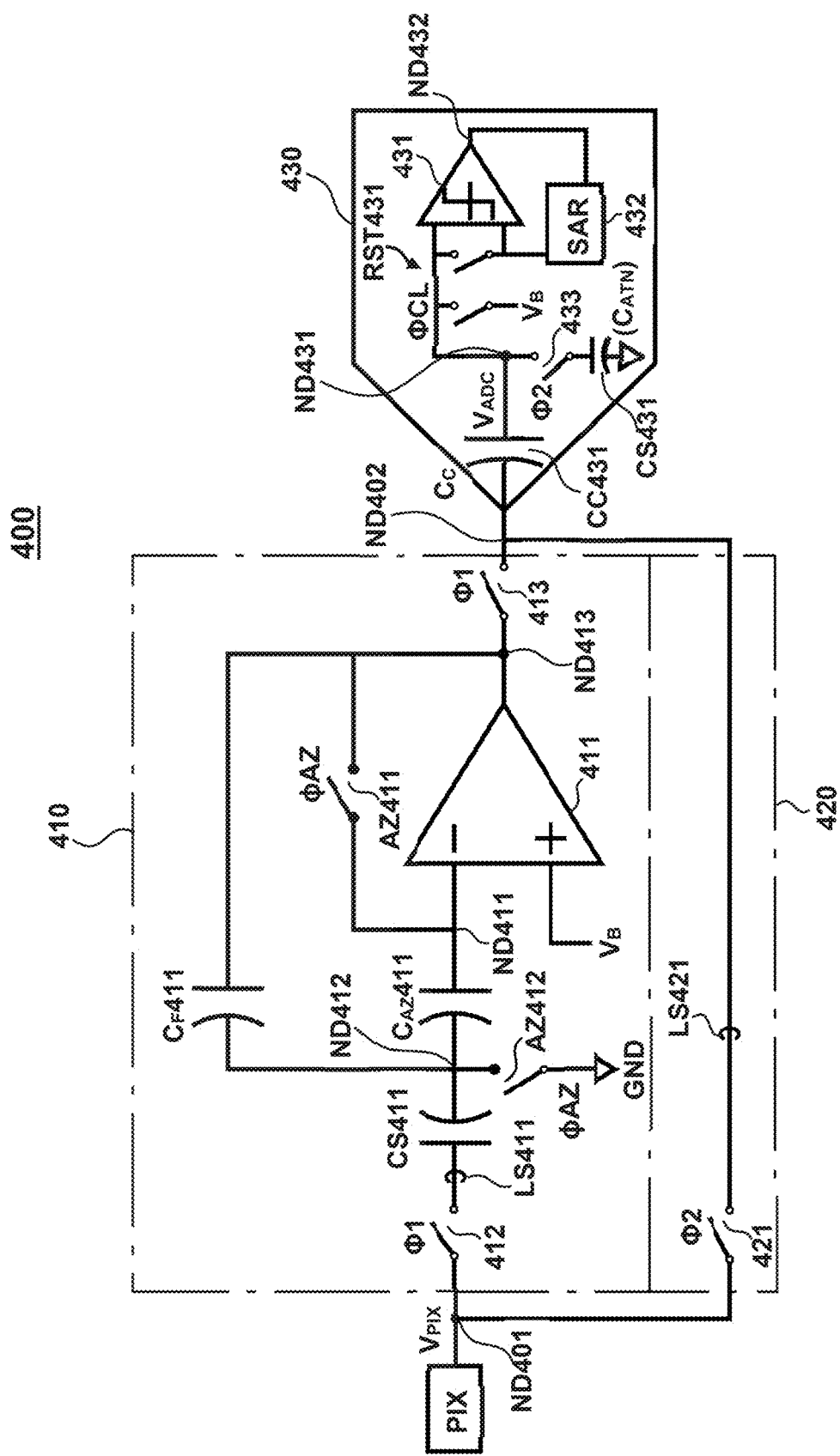
FIG. 4 is a circuit diagram showing an example configuration of a pixel signal processing part relating to the first embodiment of the present disclosure.

FIG. 4 is a circuit diagram showing an example configuration of the pixel signal processing parts according to the first embodiment of the present disclosure.

The pixel signal processing parts 400, which are capable of amplifying and analog-to-digital converting the pixel signals read out from the readable pixels 200, each include an input node ND401, a connection node ND402, a first reading part 410, a second reading part 420 and an AD converting part 430, as shown in FIG. 4.

The input node ND401 receives the first-conversion-gain signal (HCGRST, HCGSIG) and the second-conversion-gain signal (LCGSIG, LCGRST) read out as the pixel signal PIXOUT (VPIX) from the readable pixel 200 onto the vertical signal line LSGN11, and feeds the input signals to the first and second reading parts 410 and 420.

The connection node ND402 is connected to the output terminal of the first reading part 410 and the output terminal of the second reading part 320, and also connected to the input terminal of the AD converting part 430 of the subsequent stage. The connection node ND402 feeds, to the AD converting part 430, the first-conversion-gain signal inverted by the first reading part 410 and the second-conversion-gain signal processed by the second reading part 420.

Of the pixel signal PIXOUT (VPIX) input into the input node ND401, the first reading part 410 inverts the signal direction (level transitioning direction) of the first-conversion-gain signal (HCGRST, HCGSIG) and outputs the inverted first-conversion-gain signal to the connection node ND402.

Of the pixel signal PIXOUT (VPIX) input into the input node ND401, the second reading part 420 keeps the signal direction (level transitioning direction) of the second-conversion-gain signal (LCGSIG, LCGRST) unchanged, and outputs the non-inverted second-conversion-gain signal to the connection node ND402.

The following describes the specific example configuration of the first and second reading parts 410 and 420 relating to the first embodiment with reference to FIG. 4.

<Example Configuration of First Reading Part 410>

The first reading part 410 includes a first operational amplifier (amplifier) 411 whose inverting input terminal (−) is connected to the signal feeding line extending from the input node ND401. The first reading part 410 has a first node ND411 and a second node ND412 formed on a signal feeding line LS411 extending from the input node ND401, and a third node ND413 formed on an output-side signal feeding line SL412. The inverting input terminal (−) of the amplifier 411, which is connected to the signal feeding line LS411 extending from the input node ND401, is connected to the first node ND411, the output terminal of the amplifier is connected to the third node ND413. The amplifier 411 also has a non-inverting input terminal (+) connected to a reference bias potential VB.

A first input switch 412 and a first sampling capacitor CS411 are connected in series between the input node ND401 and the second node ND412. A feedback capacitor CF411 is connected between the third node ND413 and the second node ND411. An auto-zero capacitor CAZ411 is connected between the first node ND411 and the second node ND412. An auto-zero switch AZ411, which is parallel to the feedback capacitor CF411, is connected between the third node ND413 and the first node ND411. A second auto-zero switch AZ412 is connected between the second node ND412 and the reference potential GND.

The first input switch 412 is formed by, for example, a MOS transistor and is switched by a control signal 41 between the conduction state and the non-conduction state. The first input switch 412 remains in the conduction state in the first-conversion-gain signal read-out mode with the control signal 41 being fed at the high level, so that the first-conversion-gain signal (HCGRST, HCGSIG) input into the input node ND401 is input into the inverting input terminal (−) of the amplifier 411 via the first sampling capacitor CS411.

The output switch 413 is formed by, for example, a MOS transistor and is switched by a control signal φ1 between the conduction state and the non-conduction state. The output switch 413 remains in the conduction state in the first-conversion-gain signal read-out mode with the control signal φ1 being fed at the high level, so that the inverted first-conversion-gain signal (HCGRST, HCGSIG) produced by the inversion amplification performed by the amplifier 411 is input into the AD converting part 430 via the connection node ND402.

A first auto-zero switch (reset switch) AZ411 is switched between the conduction state and the non-conduction state by a control signal φAZ. The first auto-zero switch AZ411 remains in the conduction state in a predetermined start period in the first-conversion-gain signal read-out mode with the control signal φAZ being fed at the high level, so that the amplifier 411 is initialized. The first auto-zero switch AZ411 saves the offset voltage of the amplifier 411.

A second auto-zero switch (reset switch) AZ412 is switched between the conduction state and the non-conduction state by the control signal φAZ. The second auto-zero switch AZ412 remains in the conduction state in a predetermined start period in the first-conversion-gain signal read-out mode with the control signal φAZ being fed at the high level, so that the bias voltage VSS is sampled. For example, the ground potential GND and the positive bias potential (pixel reset potential) PIX-RST can be used as a sampling potential.

In this first embodiment, as described above, in the pixel signal processing part 400, the first input switch 412 and the output switch 413 are turned on and off in phase. When the first input switch 412 and the output switch 413 are ON, the first auto-zero switch AZ411 and the second auto-zero switch AZ412 are kept in the ON state to connect the second node ND412 to the bias potential VSS, so that the sampling capacitor CS411, the feedback capacitor CF411, and the auto-zero capacitor CAZ411 operates in the operation range of the capacitors, and the feedback capacitor CF411 is kept constant according to a difference of the input pixel signals, thereby making the output of the amplifier 411 in linear response to the input signal.

In the embodiment, the capacitance CAZ of the auto-zero capacitor CAZ411 is smaller than the capacitance CS of the sampling capacitor CS411. In the embodiment, the bias potential VSS is the ground potential GND or the positive bias potential (slightly higher than GND).

Operations of the first reading part 410 with the amplifier 411 during reading of the reset signal RST and during reading of the luminance signal with negative feedback will be now described. Part (A) of FIG. 5 illustrates the equivalent circuit of the first reading part 410 relating to the first embodiment of the disclosure during readout of the reset signal and Part (B) of FIG. 5 illustrates the equivalent circuit of the first reading part 410 during readout of the luminance signal with the negative feedback operation.

Figure 5:
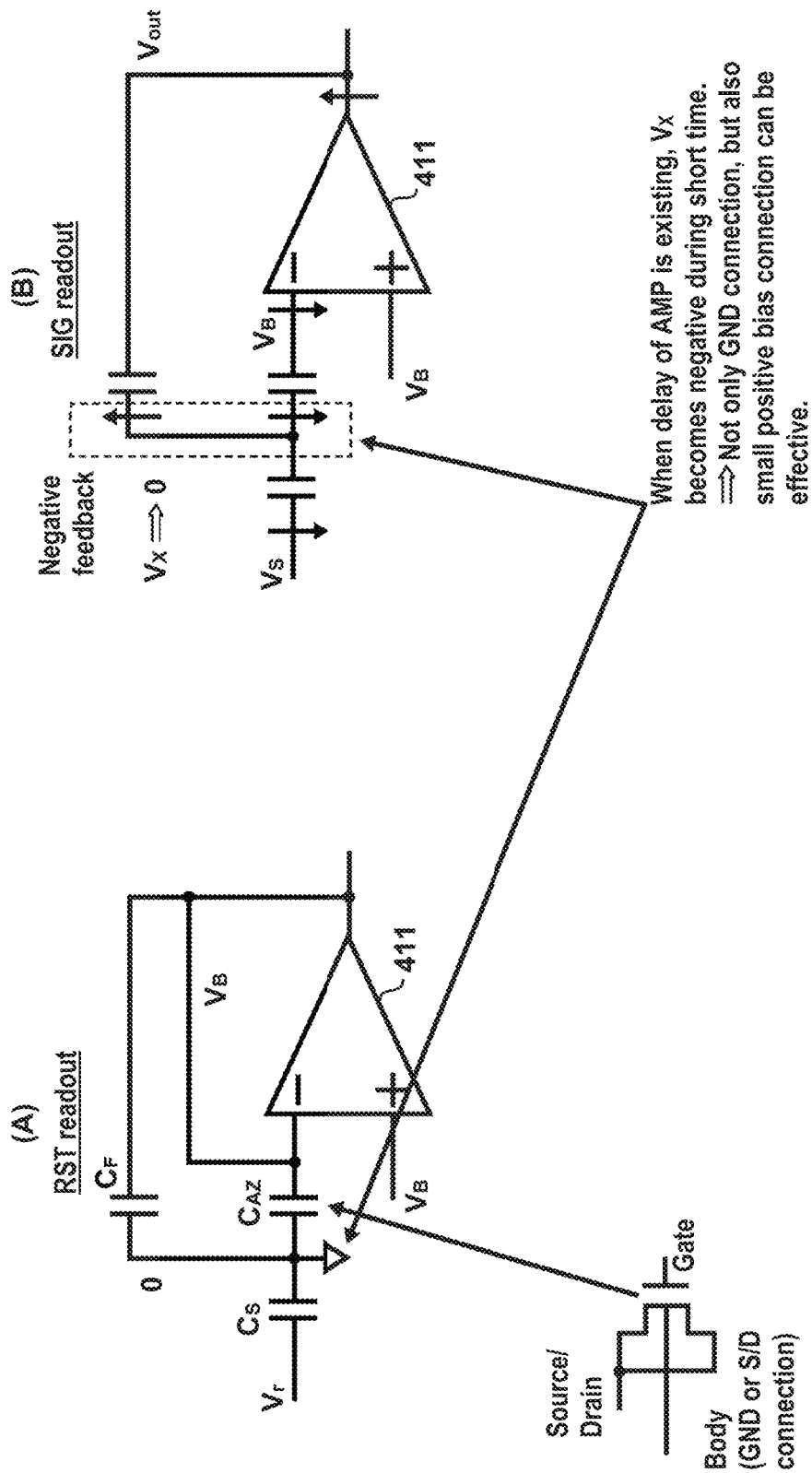
FIG. 5 illustrates equivalent circuits of a first reading part according to the first embodiment of the disclosure during reset signal readout and luminance signal readout with negative feedback operation.

During the reset signal readout, the second auto-zero switch AZ412 is kept in the ON state and the second node ND412 (Vx) is connected to the reference (bias) potential, for example, GND (0V), as shown in the part (A) of FIG. 5. The auto-zero capacitor CAZ411 is formed by a MOS capacitor and its gate is connected to the first node ND411 and the second node ND412.

During the luminance signal readout, the second auto-zero switch AZ412 is maintained in the OFF state and the second node ND412 (Vx) is disconnected from the reference potential, for example, GND (0V), as shown in the part (B) of FIG. 5. If there is a delay in the amplifier 411, the second node ND412 (Vx) goes negative for a short time. Thus, a small positive bias connection as well as a GND connection is effective.

Figure 6:
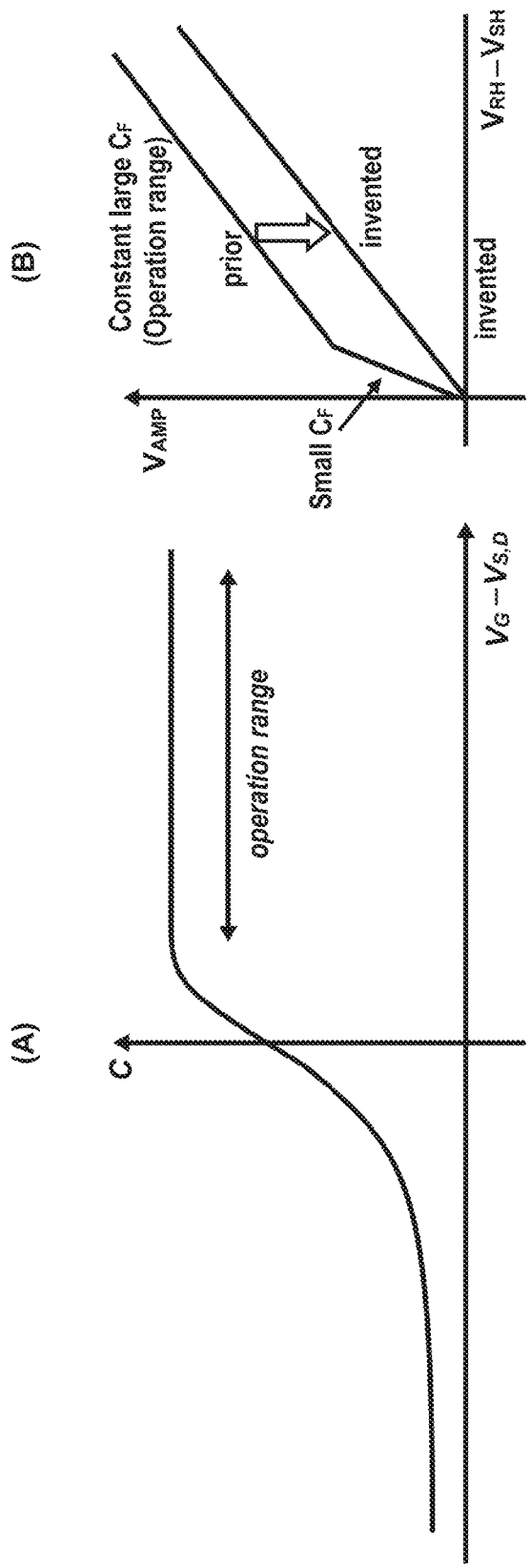
FIG. 6 is used to illustrate the linearity of input-output characteristics of an amplifier relating to the first embodiment of the present disclosure.
Figure 7:
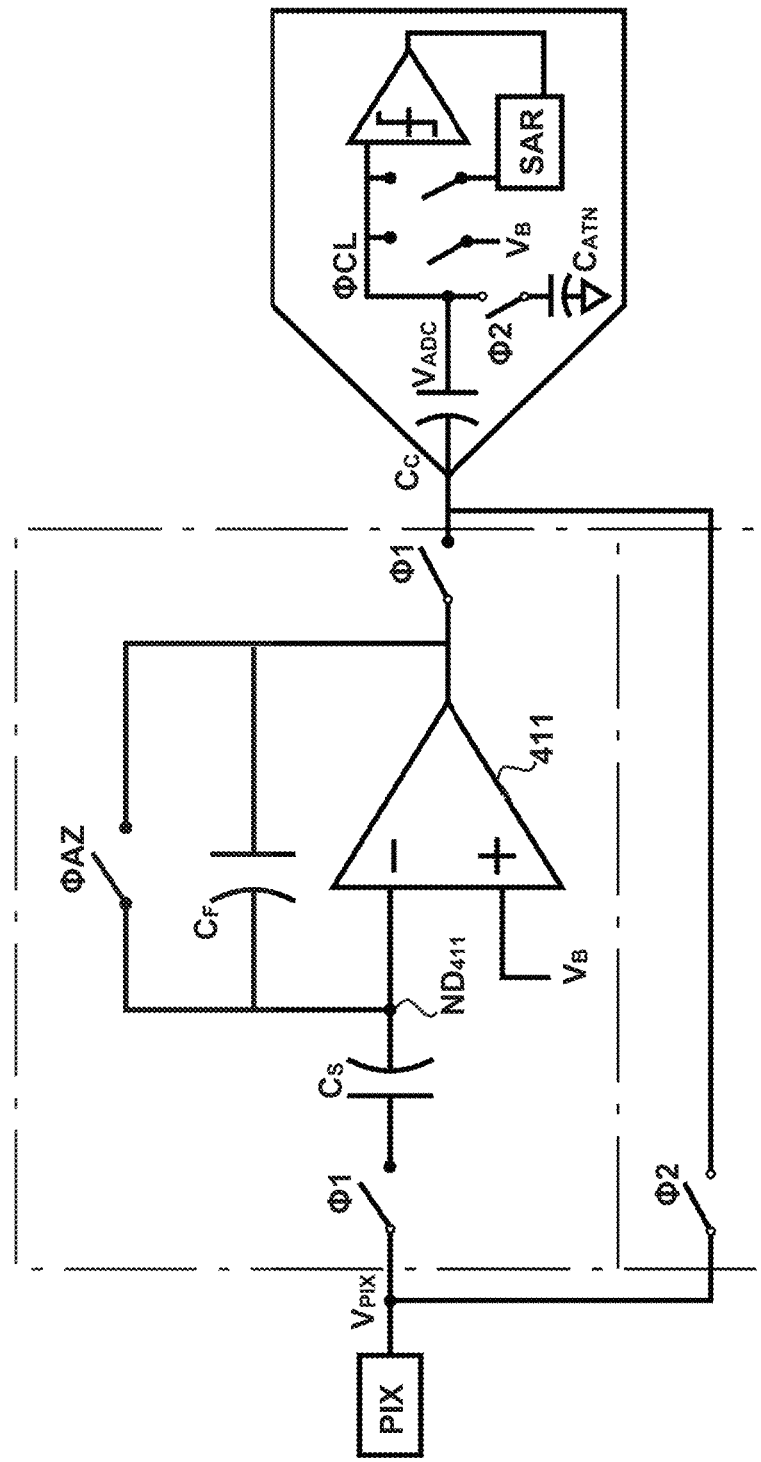
FIG. 7 illustrates an equivalent circuit of the first reading part of a comparative example.

The linearity of the input/output characteristics of the amplifier 411 will be now described in comparison with a comparative example (see the '516 Publication). FIG. 6 including parts (A) and (B) illustrates the linearity of input-output characteristics of the amplifier relating to the first embodiment. Part (A) of FIG. 6 shows an example of the operation range of a capacitor, and Part (B) of FIG. 6 illustrates the linearity of the input-output characteristics of the amplifier. FIG. 7 illustrates an equivalent circuit of the first reading part of the comparative example.

The difference between the first reading part of the first embodiment shown in FIG. 4 and the first reading part of the comparative example shown in FIG. 7 is whether or not the auto-zero capacitor CAZ411 and the second auto-zero switch AZ411 connected to the second node ND412 are provided. In other words, the first reading part of the first embodiment has the auto-zero capacitor CAZ411 and the second auto-zero switch AZ411 connected to the second node ND412 in addition to the circuit configuration of the comparative example.

<Input-Output Characteristics of Comparative Example>

The comparative example circuit shown in FIG. 7 exhibits a nonlinear input-output characteristics for the following reasons. In case of the circuit implemented by a CIS process without linear capacitors, when the control signal Φ1 is high, the first input switch 412 and output switch 413 are ON, the control signal ΦAZ is high, and the auto-zero switch AZS is turned on, a node VX is virtually shorted to the bias potential VB (~1V). Since the voltage difference between both ends of the feedback capacitor CF is 0, the feedback capacitor CF operates in the variable region of the capacitor. After the auto-zero switch AZS is turned off, the input signal VPIX drops to VSH, and the output VAMP of the amplifier 411 increases, with respect to the reference bias potential $V_B$, to the level amplified signal $(V_B+G^*(V_{RH}-V_{SH}))$ as given by multiplying the difference between the first readout reset signal HCGRST (potential $V_{RH}$) and the low-potential read-out luminance signal HCGSIG ($V_{SH}$) by the capacitance ratio times G ($C_S/C_F$). Since the feedback capacitor CF varies according to ($V_{RH}-V_{SH}$), the amplifier output VAMP shows non-linearity with respect to the input signal ($V_{RH}-V_{SH}$).

<Input-Output Characteristics of First Reading Part (the circuit) of First Embodiment>

The circuit of FIG. 4 exhibits linear input-output characteristics for the following reasons. In the circuit, the additional capacitor CAZ411 and switch AZ412 are added to the second node ND412 (VX) of the amplifier 411, which is an inverting amplifier, as shown in FIG. 4. When the control signal Φ1 is high, the first input switch 412 and the output switch 413 are the ON state, the control signal ΦAZ is high, and the auto-zero switch AZ411 is turned on, the second node ND412 (VX) is shorted to the ground potential (reference potential) GND (0V) via the switch AZ412. Since the bias potential VB and the input signal VPIX are higher than the ground potential GND, the sampling capacitor CS411, the feedback capacitor CF411, and the auto-zero capacitor CAZ411 operate in the respective operation ranges of the capacitors C. Since the feedback capacitor CF411 is constant according to the input signal (VRH−VSH), the amplifier output VAMP given by the level amplified signal $(V_B+G^*(V_{RH}-V_{SH}))$ shows linearity with respect to the input signal (VRH−VSH).

Since the auto-zero capacitor CAZ411 is about 10 to 100 fF smaller than the sampling capacitor CS411, which is about 1 pF, the increase in area due to the additional capacitor CAZ411 and switch AZ412 is less than 10% of the total area.

<Example Configuration of Second Reading Part 420>

The second reading part 420 includes a second input switch 421 connected to a signal transfer line LS420 extending between the input node ND401 and the connection node ND402.

The second input switch 421 is formed by, for example, a MOS transistor and is switched by a control signal φ21 between the conduction state and the non-conduction state. The second input switch 421 remains in the conduction state in the second-conversion-gain signal read-out mode with the control signal φ2 being fed at the high level, so that the second-conversion-gain signal (LCGSIG, LCGRST) input into the input node ND401 is input into the AD converting part 430 via the connection node ND402.

<Example Configuration of AD Converting Part 430>

The AD converting part 430 includes a second operational amplifier (amplifier) 431 whose inverting input terminal (−) is connected to a signal feeding line extending from the connection node ND402. The inverting input terminal (−) of the amplifier 431, which is connected to the signal feeding line extending from the connection node ND402, is connected to an input node ND431, the output terminal is connected to an output node ND432, and a non-inverting input terminal (+) of the amplifier 431 is connected to the output side of a referential potential control circuit 432. A sampling capacitor CC431 serving as an input capacitor is connected between the connection node ND402 and the input node ND431. A reset switch RST431 is connected between the output node ND432 and the input node ND431. A third switch 433 and the sampling capacitor CS431 are connected in series between the input node ND431, which is connected to the inverting input terminal (−) of the amplifier 431, and the reference potential VSS.

The third input switch 433 is formed by, for example, a MOS transistor and is switched by the control signal φ2 between the conduction state and the non-conduction state. The third input switch 433 connects the sampling capacitor CS431 to the sampling capacitor CC431 via the input node ND431 in the second-conversion-gain signal read-out mode. The presence of the sampling capacitor CS431 makes it possible to adjust the amplitude of the pixel signal, in particular, to reduce (adjust) the amplitude of high-amplitude pixel signals to such a level that AD conversion can be performed. In this manner, the dynamic range can be increased.

The third reset switch RST431 is switched between the conduction state and the non-conduction state by a control signal φCL (RST_LCG). The third reset switch RST431 remains in the conduction state in a predetermined start period in the first-conversion-gain signal read-out mode with the control signal φCL (RST_LCG) being fed at the high level, so that the amplifier 431 is initialized.

<Reading Operation of Solid-State Imaging Device 10>

The above has described the characteristic configurations and functions of the parts of the solid-state imaging device 10. Next, a detailed description will be given of the read-out operation performed to read the pixel signal in the solid-state imaging device 10 relating to the first embodiment.

Figure 8:
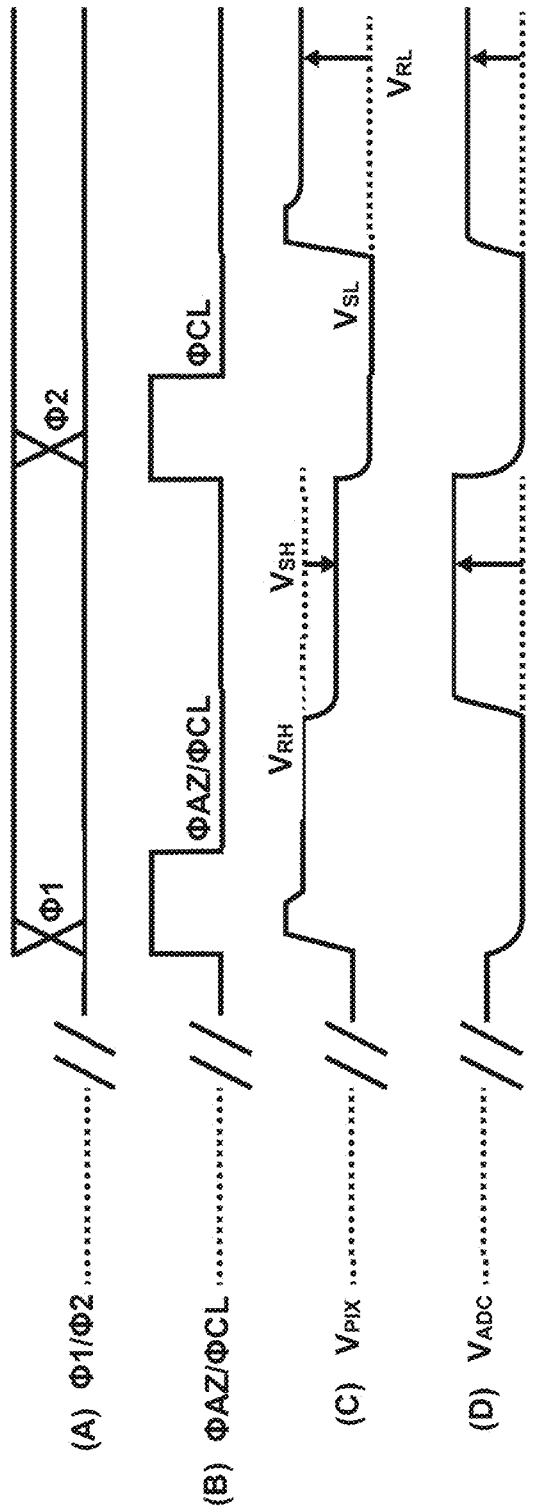
FIG. 8 is a timing chart to illustrate how to read a pixel signal from a readable pixel in a dual-conversion-gain read-out mode in the solid-state imaging device relating to the first embodiment of the present disclosure.

FIG. 8 is a timing chart including parts (A) to (D) to illustrate how to read a pixel signal from a readable pixel in a dual-conversion-gain read-out mode in a solid-state imaging device relating to the first embodiment of the present disclosure.

In FIG. 8, the part (A) shows the control signal φ1 for the first input switch 412 and the output switch 413 of the first reading part 410 in the pixel signal processing part 400. In FIG. 8, the part (B) shows the control signal φAZ (RST_HCG) for the first auto-zero switch AZ411 and second auto-zero switch AZ412 of the first reading part 410 of the pixel signal processing part 400, and the control signal φCL (RST_LCG) for the second reset switch RST431 of the AD converting part 430. In FIG. 8, the part (C) shows the pixel signal VPIX (PIXOUT) read from the readable pixel 200, and the part (D) shows the amplified output signal AMPOUT (VADC) from the first and second reading parts 410 and 420 of the pixel signal processing part 400.

Before the dual-conversion-gain read-out mode MDCG starts, the control signals RST, SG and TG remain at the high level for a predetermined period of time, to keep the reset transistor RST11-Tr, the storage transistor SG11-Tr, and the transfer transistor TG11-Tr in the conduction state for a predetermined period of time. This resets the photodiode PD11, the floating diffusion FD11 and the storage capacitor CS11 to the fixed potential VAAPIX. In other words, a shutter operation is performed.

<Read-Out Operation in First-Conversion-Gain Signal Read-Out Mode>

At the timing when the transfer transistor TG11-Tr is switched from the conduction state to the non-conduction state, the exposure period PEXP starts and the reading operation is performed in the first-conversion-gain signal read-out mode. After a certain period of time elapses since the start of the exposure period PEXP, the control signal SG is switched to and remains in the high level for a predetermined period of time. After this, the first-read-out reset signal (HCGRST) starts to be read out. Since the control signal SG remains at the low level to keep the storage transistor SG11-Tr in the non-conduction state, the charges in the floating diffusion FD11 and the charges in the storage capacitor CS11 are separated from each other, so that the gain of the floating diffusion FD11 remains at the first conversion gain HCG corresponding to the first capacitance including the capacitance CFD of the floating diffusion FD11.

In a first reset signal read-out period following the resetting, the first read-out reset signal HCGRST, which is produced through conversion with the first conversion gain HCG corresponding to the first capacitance of the floating diffusion FD11, is read from the source follower transistor SF11-Tr to the vertical signal line LSGN11. The first read-out reset signal HCGRST is subject to a predetermined operation in the reading circuit 40 serving as a column processing circuit. In other words, a first-conversion-gain reset read-out operation HCGRRD is performed.

The first reset signal read-out period is followed by a first transfer period, in which the control signal TG is switched to the high level to keep the transfer transistor TG11-Tr in the conduction state, so that the charges stored in the photodiode PD11 are transferred to the floating diffusion FD11. After the first transfer period, the control signal TG is switched to the low level to switch the transfer transistor TG11-Tr into the non-conduction state.

The first transfer period is followed by a first signal read-out period, in which the first read-out signal HCGSIG, which is produced through conversion with the first conversion gain corresponding to the first capacitance of the floating diffusion FD11, is read from the source follower transistor SF11-Tr to the vertical signal line LSGN11. The first read-out signal HCGSIG is subject to a predetermined operation in the reading circuit 40 serving as the column processing circuit. In other words, a first-conversion-gain read-out operation HCGSRD is performed.

The reset level (VHCGRST, $V_{RH}$) and the signal level (VHCGSIG, $V_{SH}$) are held, or a digital CDS operation is performed based on the difference between the reset level and the signal level.

In the first-conversion-gain signal read-out mode, the reading circuit 40 performs the following operations. In the first-conversion-gain signal read-out mode, the control signal φ1 having the active high level is fed to the first input switch 412 and the output switch 413 of the first reading part 410 in the pixel signal processing part 400 of the reading circuit 40. On the other hand, in the first-conversion-gain signal read-out mode, the control signal φ2 having the non-active low level is fed to the second input switch 421 of the second reading part 420 in the pixel signal processing part 400 of the reading circuit 40. This means that, in the first-conversion-gain signal read-out mode, the first reading part 410 of the pixel signal processing 400 is active, and the second reading part 420 is non-active.

In the first reading part 410, the control signal RST_HCG is fed at the high level in a predetermined start period in the first-conversion-gain signal read-out mode, so that the first auto-zero switch AZ411 is switched to the conduction state and the amplifier 411 is initialized. In the first-conversion-gain signal read-out mode, the first read-out reset signal HCGRST (potential $V_{RH}$), which is the first-conversion-gain signal, is input and then inverted by the amplifier 411.

In the first-conversion-gain signal read-out mode, since the control signals φ2 and RST_LCG fed to the third input switch 433 and the second reset switch RST431 indicate the non-active state, the AD converting part 430 performs AD conversion by comparing the output signal AMPOUT from the first reading part 410, which is fed to the inverting input terminal (−) of the amplifier 431, and a predetermined potential fed to the non-inverting input terminal (+).

In the first-conversion-gain signal read-out mode, the first reading part 410 serving as an amplifying part receives the first read-out reset signal HCGRST (potential $V_{RH}$) and subsequently receives the first read-out luminance signal HCGSIG (potential $V_{SH}$), which has a lower potential than the first read-out reset signal HCGRST. The first read-out reset signal HCGRST (potential $V_{RH}$) and the first read-out reset signal HCGRST are inverted and amplified by the amplifier 411 and then output to the subsequent stage or the AD converting part 430. The output signal AMPOUT from the amplifier 411 of the first reading part 410 is represented as $(V_B+G^*(V_{RH}-V_{SH}))$ obtained by amplifying the referential potential $V_B$ by the result of multiplying the difference between the first read-out reset signal HCGRST (potential $V_{RH}$) and the read-out luminance signal HCGSIG ($V_{SH}$) having a lower potential by the capacitance ratio G ($C_S/C_F$).

<Read-Out Operation in Second-Conversion-Gain Signal Read-Out Mode>

After the first conversion gain read-out operation HCGSRD, the control signal SG is switched from the low level to the high level, to place the storage transistor SG11-Tr into the conduction state and to connect the storage capacitor CS11 to the floating diffusion FD11. In this way, the charges in the floating diffusion FD11 and the charges in the storage capacitor CS11 are combined, so that the gain of the floating diffusion FD11 is switched to the second conversion gain LCG corresponding to the second capacitance. In this manner, the first conversion gain signal read-out mode ends and the second conversion gain signal read-out mode starts.

The first signal read-out period is followed by a second transfer period, in which the control signal TG is switched to the high level to keep the transfer transistor TG11-Tr in the conduction state, so that the charges stored in the photodiode PD11 are transferred to the floating diffusion FD11. After the second transfer period, the control signal TG is switched to the low level to switch the transfer transistor TG11-Tr into the non-conduction state. The first signal read-out period is followed by the second transfer period and then a second signal read-out period, in which the second conversion gain read-out operation LCGSRD is performed. Specifically, a second read-out signal LCGSIG, which is produced through conversion with the second conversion gain LCG corresponding to the second capacitance of the floating diffusion FD11, is read from the source follower transistor SF11-Tr to the vertical signal line LSGN11 and processed in a predetermined manner in the reading circuit 40 serving as the column processing circuit.

After the second signal read-out period has elapsed, the control signal RST is switched to the high level to switch the reset transistor RST11-Tr into the conduction state. In this way, the second reset signal read-out period begins. In a second reset signal read-out period, a second conversion gain reset read-out operation HCGRRD is performed. Specifically, a second read-out reset signal LCGRST, which is produced through conversion with the second conversion gain LCG corresponding to the second capacitance of the floating diffusion FD11, is read from the source follower transistor SF11-Tr to the vertical signal line LSGN11 and processed in a predetermined manner in the reading circuit 40 serving as the column processing circuit.

The reset level (LCGRST, $V_{RL}$) and the signal level (LCGSIG, $V_{SL}$) are held, or an offset noise cancel operation is performed based on the difference between the reset level LCGRST ($V_{RL}$) and the signal level LCGSIG ($V_{SL}$).

In the second-conversion-gain signal read-out mode, the reading circuit 40 performs the following operations. In the second-conversion-gain signal read-out mode, the control signal φ1 fed to the first input switch 412 and the output switch 413 of the first reading part 410 in the pixel signal processing part 400 of the reading circuit 40 is non-active or at the low level. On the other hand, in the second-conversion-gain signal read-out mode, the control signal φ2 fed to the second input switch 421 of the second reading part 420 in the pixel signal processing part 400 of the reading circuit 40 is kept active or at the high level. This means that, in the second-conversion-gain signal read-out mode, the first reading part 410 of the pixel signal processing part 400 is non-active, and the second reading part 420 is active. This allows the amplifier 411 of the first reading part 410 to remain turned-off during the second-conversion-gain signal read-out mode, thereby achieving reduced power consumption.

In the second-conversion-gain signal read-out mode, since the control signals φ2 and RST_LCG fed to the third input switch 433 and the second reset switch RST431 indicates the active state, the AD converting part 430 performs the following operation on the output signal AMPOUT from the second reading part 420, which is fed to the inverting input terminal (−) of the amplifier 431.

In the second-conversion-gain signal read-out mode, the second reading part 420 serving as an attenuator and the amplifier 431 of the AD converting part 430 receive the second read-out luminance signal LCGSIG (potential $V_{SL}$), which has not been inverted, and subsequently receive the second read-out reset signal LCGRST (potential $V_{RL}$). The output signal AMPOUT from the amplifier 431 of the AD converting part 430 is represented as $(V_B + G^*(V_{RL} - V_{SL}))$ obtained by attenuating the referential potential $V_B$ by the result of multiplying the difference between the second read-out luminance signal LCGSIG (potential $V_{SL}$) and the second read-out reset signal LCGRST ($V_{RL}$) by the capacitance ratio G $(C_C/(C_C + C_{SH}))$.

As described above, in the first embodiment, the pixel signal processing unit 400, which is capable of performing AD conversion, includes the input node ND401, the connection node ND402, the first reading part 410, the second reading part 420 and the AD converting part 430, as shown in FIG. 4. The first reading part 410 inverts the signal direction (level transitioning direction) of the first-conversion-gain signal (HCGRST, HCGSIG) of the pixel signal PIXOUT inputted into the input node ND401, and outputs the inverted first-conversion-gain signal (HCGRST, HCGSIG), which has been subjected to inversion and amplification, to the AD converting part 430 via the connection node ND402.

In the first reading part 410, the inverting input terminal (−) of the amplifier 411, which is connected to the signal feeding line LS411 extending from the input node ND401, is connected to the first node ND411, the output terminal of the amplifier is connected to the third node ND413, and the non-inverting input terminal (+) of the amplifier is connected to the reference bias potential VB. The first input switch 412 and sampling capacitor CS411 are connected in series between the input node ND401 and second node ND412. The feedback capacitor CF411 is connected between the third node ND413 and second node ND411, and the auto-zero capacitor CAZ411 is connected between the third node ND411 and second node ND412. The first auto-zero switch AZ411 is connected in parallel with the feedback capacitor CF411 between the third node ND413 and the first node ND411. The second auto-zero switch AZ412 is connected between the second node ND412 and reference potential GND, and the non-inverting input terminal (+) of the amplifier 411 is connected to the bias potential VB.

In the first embodiment, in the pixel signal processing part 400, the first input switch 412 and the output switch 413 are turned on and off in phase. When the first input switch 412 and the output switch 413 are ON and the second input switch 421 is OFF, the first auto-zero switch AZ411 and the second auto-zero switch AZ412 are kept in the ON state to connect the second node ND412 to the reference potential VSS (GND), so that the sampling capacitor CS411, the feedback capacitor CF411, and the auto-zero capacitor CAZ411 are operated in respective operation ranges of the capacitors, and the feedback capacitor CF411 is kept constant according to a difference of the input pixel signals, thereby making the output of the amplifier 411 in linear response to the input signal.

From among the pixel signals PIXOUT input into the input node ND401, the second reading part 420 keeps the signal direction (level transitioning direction) of the second-conversion-gain signal (LCGSIG, LCGRST) unchanged, and outputs the non-inverted second-conversion-gain signal (LCGSIG, LCGRST) to the AD converting part 430 via the connection node ND402. The presence of the sampling capacitor CS431 makes it possible to adjust the amplitude of the pixel signal, in particular, to reduce (adjust) the amplitude of high-amplitude pixel signals to such an extent that AD conversion can be performed. In this manner, the dynamic range can be increased.

The first embodiment can thus read signals produced with different conversion gains and having different signal directions. According to the aspects of the disclosure, signals produced with different conversion gains and having different signal directions can be read, but also the input-output linearity can be improved, an increase in power consumption and circuit area can be prevented, the chip cost can be reduced, a high dynamic range can be provided, and thus high image quality can be thus achieved. In the second-conversion-gain signal read-out mode, the first reading part 410 of the pixel signal processing part 400 remains non-active, and the second reading part 420 remains active. This allows the amplifier 411 of the first reading part 410 to remain turned-off during the second-conversion-gain signal read-out mode, thereby achieving reduced power consumption. In addition, since the inverting first conversion gain signal and non-inverting second conversion gain signal in the same direction can be supplied to the AD converter part 430, it is possible to convert the inverting first conversion gain signal and non-inverting second conversion gain signal inputted without overhead using an existing ADC, which allows the cost of the applied camera system to be reduced.

Second Embodiment

Figure 9:
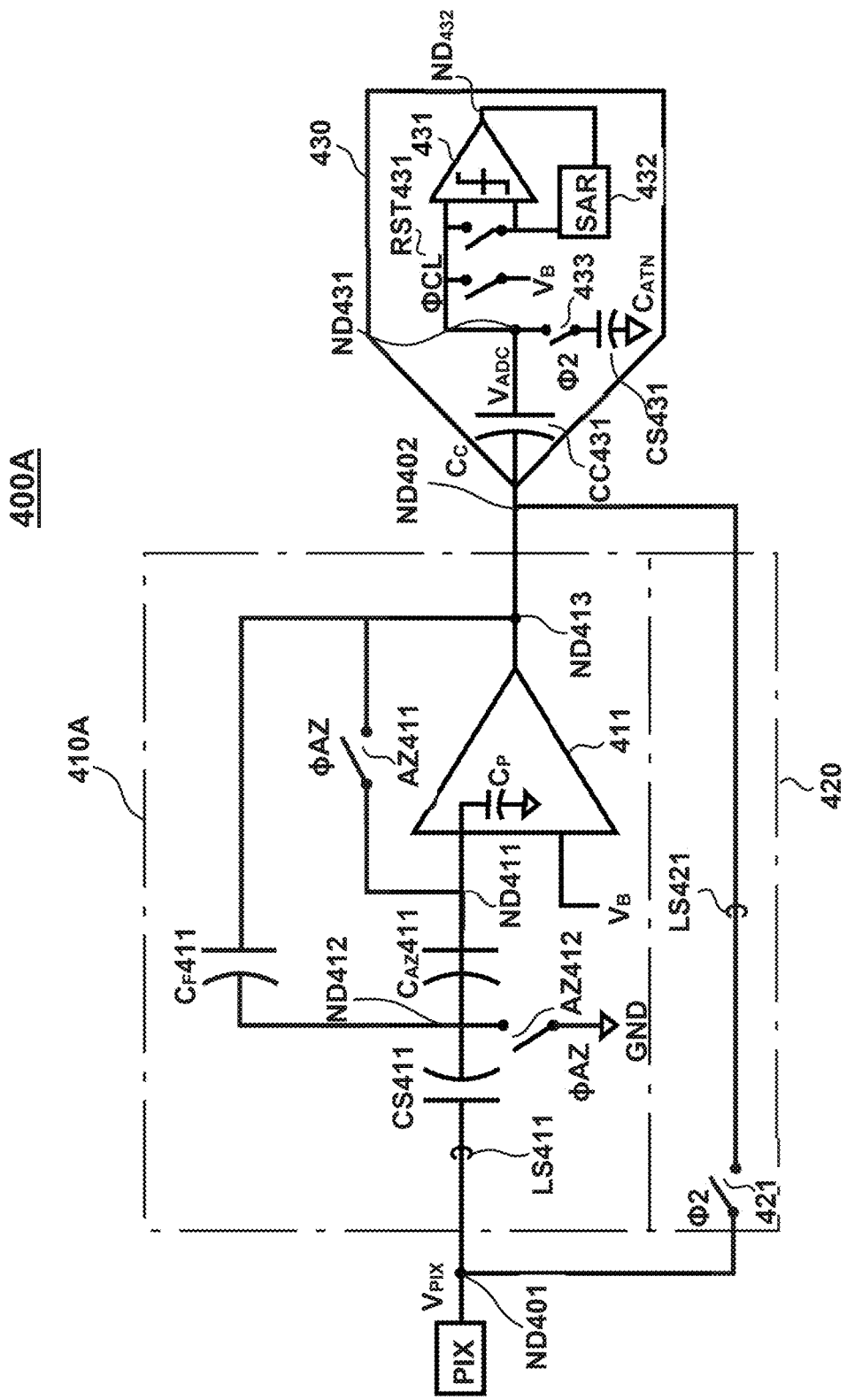
FIG. 9 is a circuit diagram showing an example configuration of main parts of a pixel signal processing part relating to a second embodiment of the present disclosure.
Figure 10:
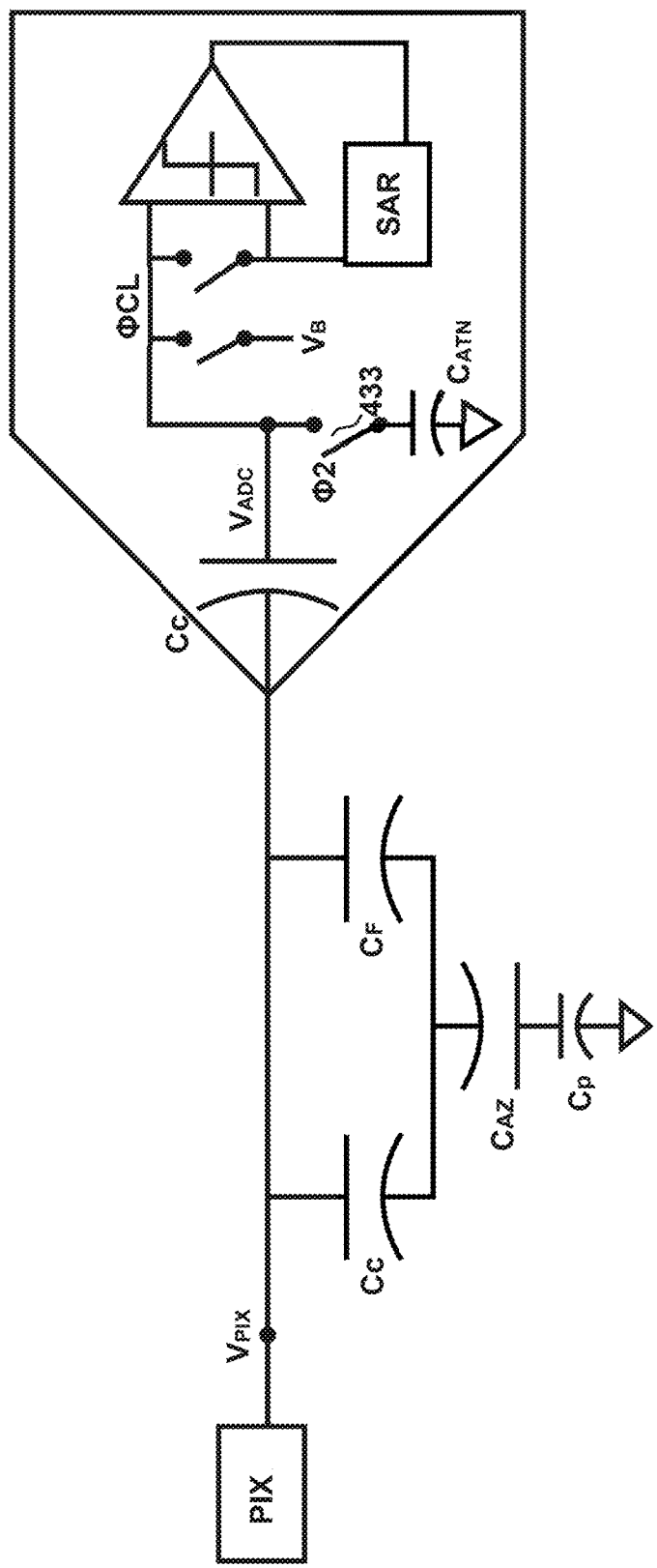
FIG. 10 illustrates an equivalent circuit of the first and second reading parts when a control signal Φ2 of the second reading part in the pixel signal processing part relating to the second embodiment.

FIG. 9 is a circuit diagram showing an example configuration of main parts of a pixel signal processing part relating to a second embodiment of the present disclosure. FIG. 10 illustrates an equivalent circuit of the first and second reading parts when the control signal Φ2 of the second reading part in the pixel signal processing part relating to the second embodiment.

A pixel signal processing part 400A relating to the second embodiment differs from the pixel signal processing part 400 relating to the first embodiment in terms of the following points.

In the pixel signal processing part 400 of the first embodiment, the first reading part 410 includes the amplifier 411, and the first input switch 412 and output switch 413 whose on/off is controlled by the control signal Φ1 are provided.

Whereas, in the pixel signal processing part 400A of this second embodiment, the first input switch 412 and the output switch 413 are not provided. In the first reading part 410A, the input node ND401 is directly connected to the sampling capacitor CS411, and the third node ND413 connected to the output terminal of the amplifier 411 is directly connected to the connection node ND402.

In the pixel signal processing part 400A of this second embodiment, the input and output switches controlled by the control signal Φ1 are removed. And during the period when the control signal Φ2 is active, the amplifier 411 is turned off. As shown in the equivalent circuit of FIG. 10, when the control signal Φ2 is active e.g. at high level, the parasitic load capacitance caused by the amplifier 411 is small because the large capacitors of CS and CF appear small with the serialized small capacitors CAZ411 and Cp. Thus, the circuit area can be further reduced by removing the switches.

According to the second embodiment, signals produced with different conversion gains and having different signal directions can be read, but also the input-output linearity can be improved, an increase in power consumption and circuit area can be prevented, the chip cost can be reduced, a high dynamic range can be provided, and thus high image quality can be thus achieved.

Third Embodiment

Figure 11:
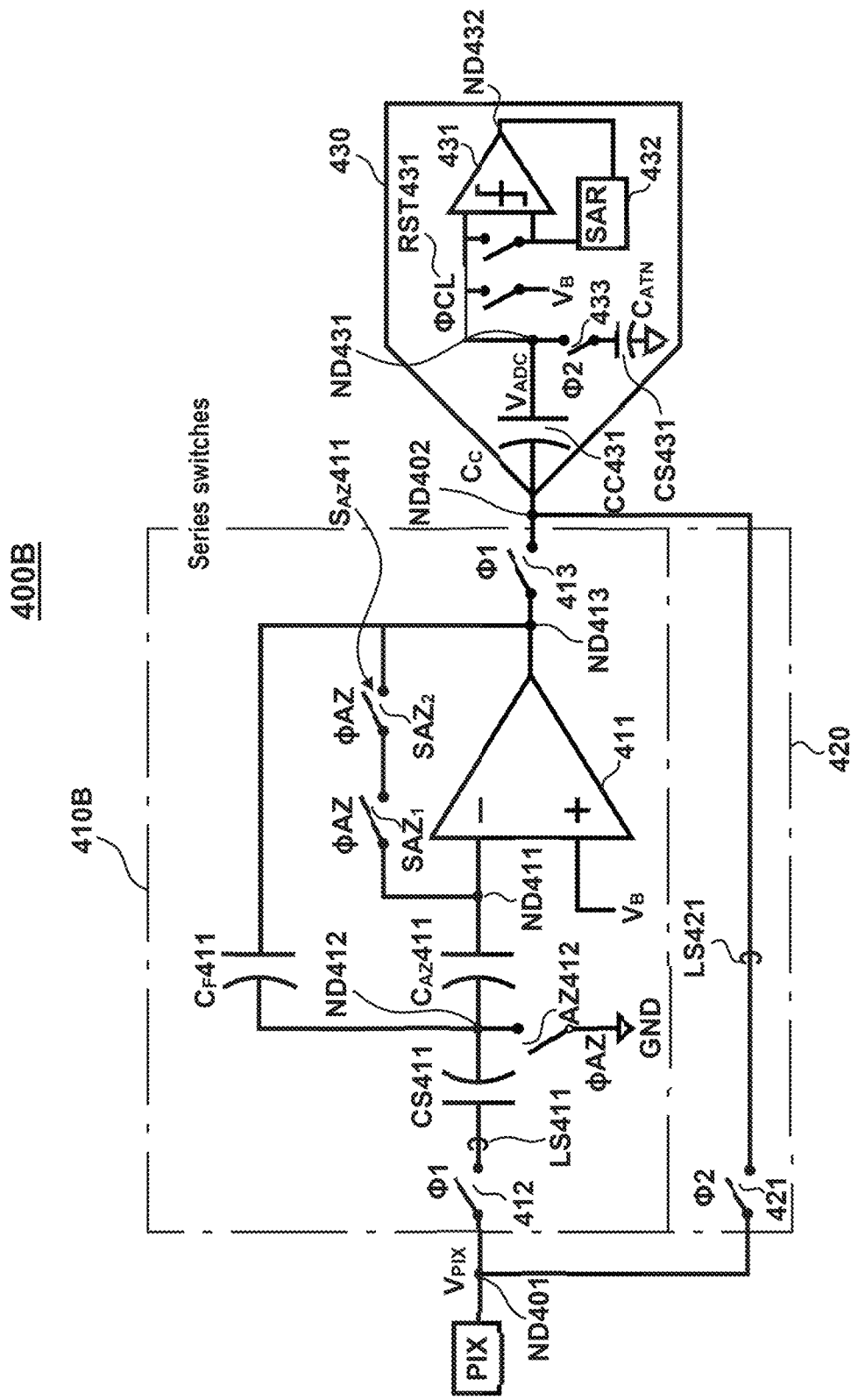
FIG. 11 is a circuit diagram showing an example configuration of main parts of a pixel signal processing part relating to a third embodiment of the present disclosure.

FIG. 11 is a circuit diagram showing an example configuration of main parts of a pixel signal processing part according to a third embodiment of the present disclosure.

A pixel signal processing part 400B relating to the third embodiment differs from the pixel signal processing part 400 relating to the first embodiment in terms of the following points.

In the pixel signal processing part 400B of the third embodiment, the first auto-zero switch AZ411 is not formed by a single switch of a MOS transistor, but by a series switch SAZ411 made of multiple, in this example, two switches SAZ1 and SAZ2 made of MOS transistors connected in series, in order to achieve low leakage.

<Low Leakage by Series Switch>

In the pixel signal processing part 400, when the auto-zero capacitor CAZ is as small as 10 fF, the amplifier output VAMP may vary with time due to leakage current between the first node ND411 (VY) and amplifier output VAMP. The pixel signal processing part 400B of the third embodiment is configured to suppress voltage fluctuations by using the series switch SAZ411. The series switch SAZ411 has the advantage of being more area efficient than a single switch to increase CAZ.

In addition to the advantage of being area efficient, the third embodiment can produce the same effects as the above-described first embodiment.

Fourth Embodiment

Figure 12:
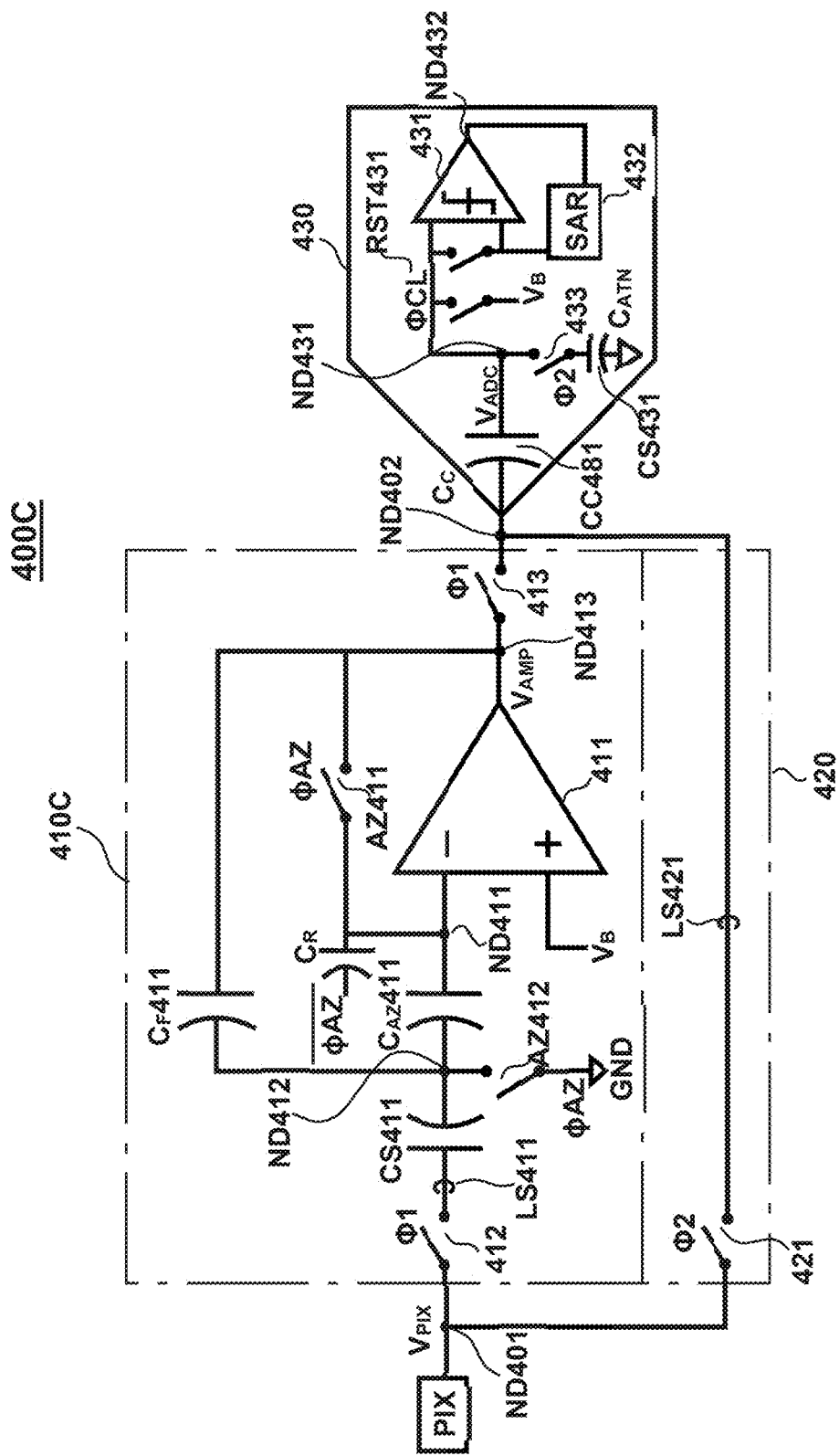
FIG. 12 is a circuit diagram showing an example configuration of main parts of a pixel signal processing part relating to a forth embodiment of the present disclosure.
Figure 13:
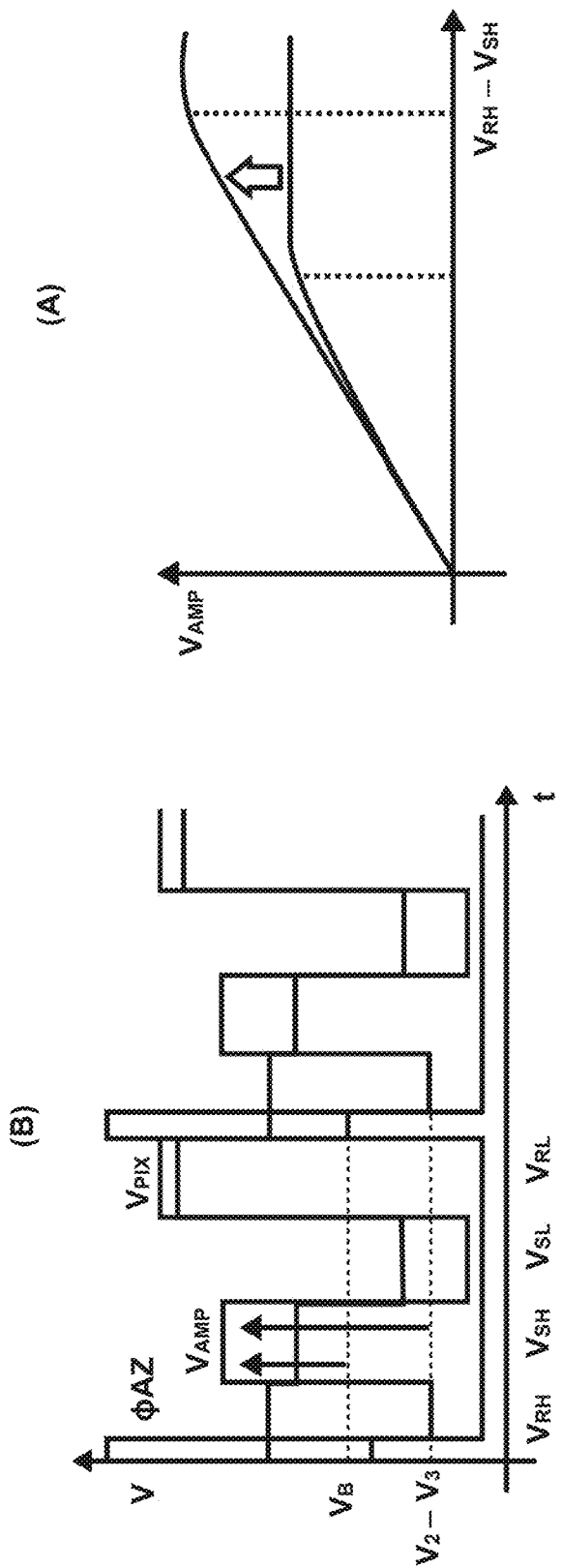
FIG. 13 illustrates signal processing characteristics of the pixel signal processing part relating to the fourth embodiment of the disclosure.

FIG. 12 is a circuit diagram showing an example configuration of main parts of a pixel signal processing part according to the fourth embodiment of the present disclosure. FIG. 13 including parts (A) and (B) illustrates signal processing characteristics of the pixel signal processing part relating to the fourth embodiment of the disclosure. In FIG. 13, the part (A) shows the input-output characteristics of the amplifier, and the part (B) shows the voltage level of the input signal over time.

A pixel signal processing part 400C relating to the fourth embodiment differs from the pixel signal processing part 400 relating to the first embodiment in terms of the following points.

In the pixel signal processing part 400C of the fourth embodiment, a charge injection capacitor CR is connected to the connection line between the first auto-zero switch AZ411 and the first node ND411 as an additional capacitor that injects charge into the connection line when the first auto-zero switch AZ411 is turned off.

<Expansion of Output Range by Capacitor>

As described above, in the pixel signal processing part 400C of the fourth embodiment, the capacitor CR is added to the circuit configuration of FIG. 4. When the control signal ΦAZ is switched to the low level and the first auto-zero switch AZ411 is turned off, charge is injected from the additional capacitor CR into the first node ND411 (VY) and the amplifier output VAMP is reduced due to VR. This reduces the minimum voltage of the amplifier output VAMP, thereby increasing the output range of the amplifier 411, which is the inverting amplifier.

In addition to the above advantage of the expansion of the output range of the amplifier 411, the fourth embodiment can produce the same effects as the above-described first embodiment.

Fifth Embodiment

Figure 14:
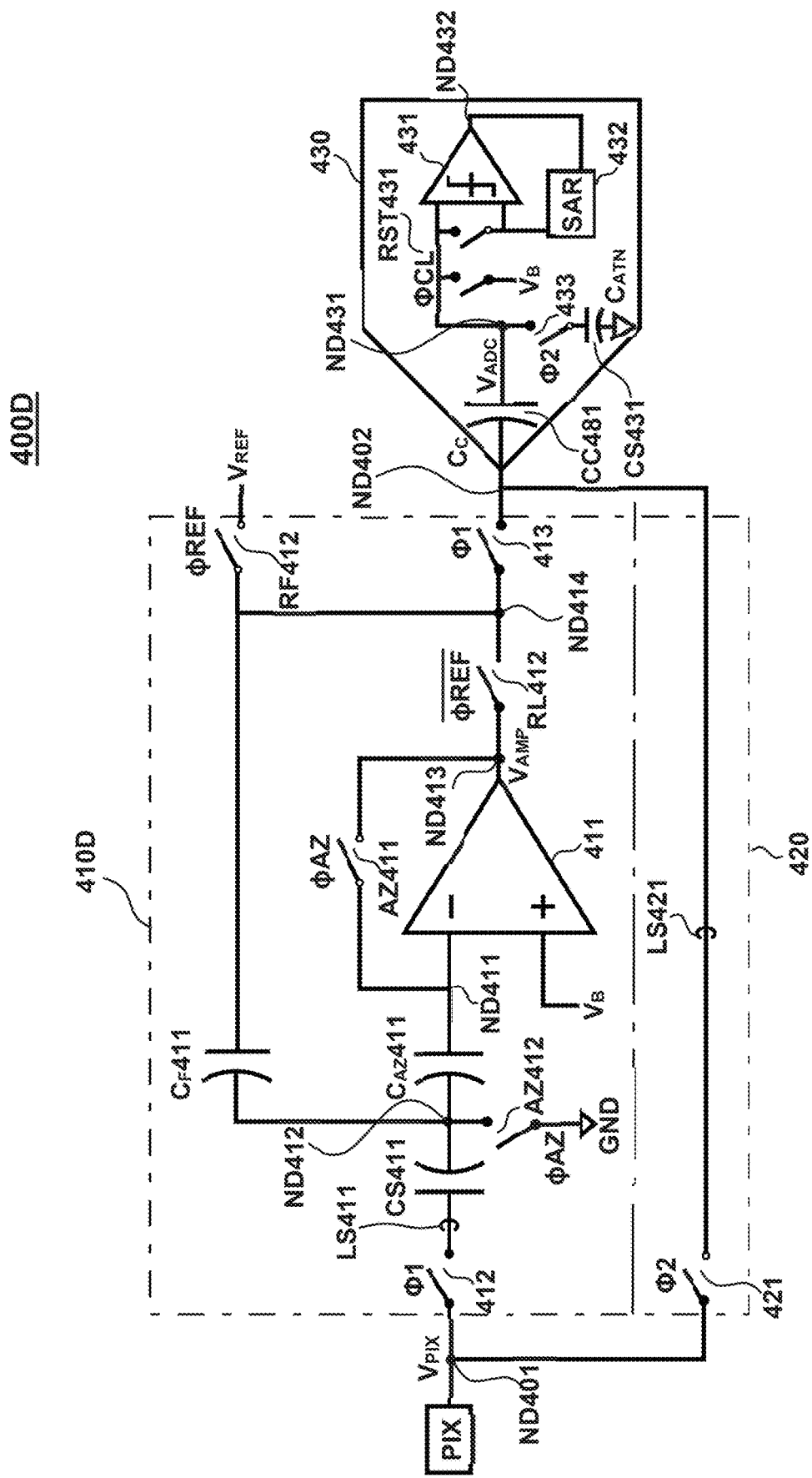
FIG. 14 is a circuit diagram showing an example configuration of main parts of a pixel signal processing part relating to a fifth embodiment of the present disclosure.
Figure 15:
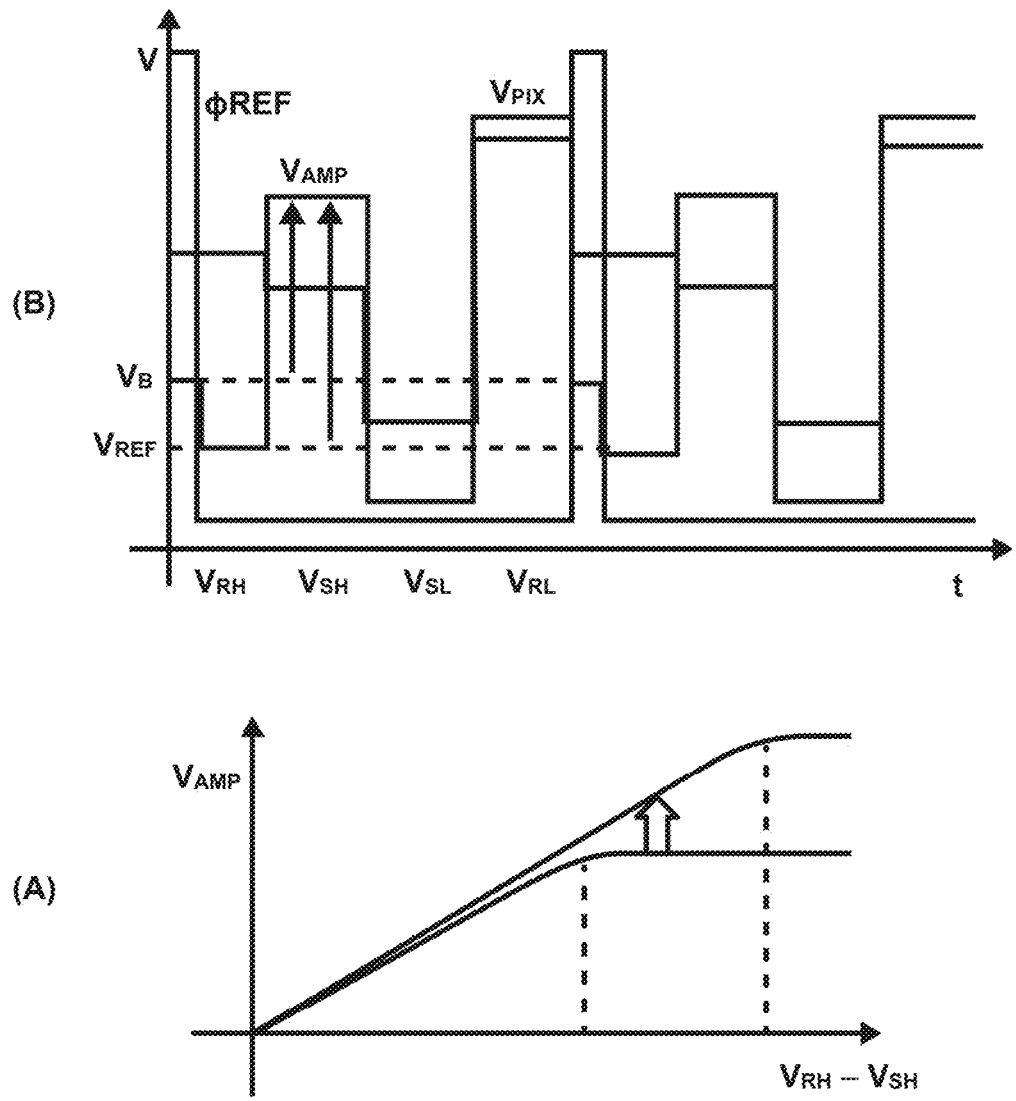
FIG. 15 is a circuit diagram showing an example configuration of the pixel signal processing part relating to the fifth embodiment of the present disclosure.
Figure 16:
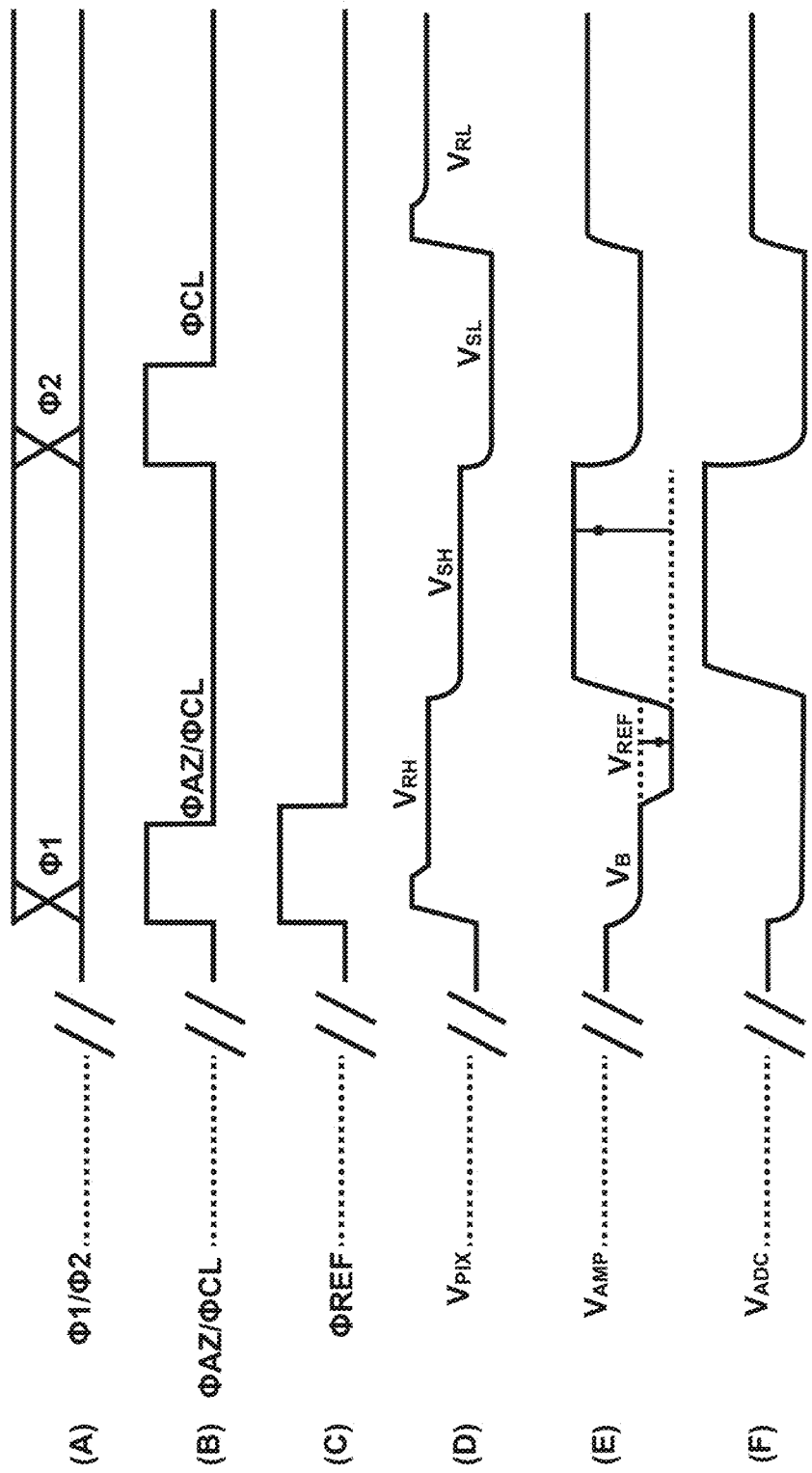
FIG. 16 is a timing chart to illustrate how to read a pixel signal from a readable pixel in a dual-conversion-gain read-out mode in a solid-state imaging device relating to the fifth embodiment of the present disclosure.

FIG. 14 is a circuit diagram showing an example configuration of main parts of a pixel signal processing part according to the fifth embodiment of the present disclosure. FIG. 15 including parts (A) and (B) illustrates signal processing characteristics of the pixel signal processing part relating to the fifth embodiment of the disclosure. In FIG. 15, the part (A) shows the input-output characteristics of the amplifier, and the part (B) shows the voltage level of the input signal over time. FIG. 16 is a timing chart including parts (A) to (F) to illustrate how to read a pixel signal from a readable pixel in a dual-conversion-gain read-out mode in a solid-state imaging device relating to the fifth embodiment of the disclosure.

In FIG. 16, the part (A) shows the control signal 41 for the first input switch 412 and the output switch 413 of the first reading part 410D of the pixel signal processing part 400D, and the control signal φ2 for the second input switch 421 of the second reading part 420 and the third input switch 433 of the AD converting part 430. In FIG. 16, the part (B) shows the control signal φAZ (RST_HCG) for the first auto-zero switch AZ411 and second auto-zero switch AZ412 of the first reading part 410D of the pixel signal processing part 400D, and the control signal φCL (RST_LCG) for the second reset switch RST431 of the AD converting part 430. In FIG. 16, the part (C) shows the reference signal φREF, the part (D) shows the pixel signal VPIX (PIXOUT) read from the readable pixel 200, and the parts (E) and (F) show the amplified output signal VAMP (AMPOUT), VADC from the first and second reading parts 410D and 420 of the pixel signal processing part 400D.

A pixel signal processing part 400D relating to the fifth embodiment differs from the pixel signal processing part 400 relating to the first embodiment in terms of the following points.

In the pixel signal processing unit 400D of this fifth embodiment, the following configuration is added to the circuit configuration of FIG. 4. The following explanation focuses on the added and changed points.

The pixel signal processing part 400D of the fifth embodiment includes: a fourth node ND414 on the signal input line of the output switch 413; the first auto-zero switch AZ411 connected between the third node ND413 and the first node ND411; a first reference switch RF411 connected between the third node ND413 coupled to the output terminal of the amplifier 411 and the fourth node ND414; the feedback capacitor CF411 connected between the fourth node ND414 and the second node ND412; and a second reference switch REF412 connected between the line connecting the feedback capacitor CF411 and the fourth node ND414 and the reference potential Vref. The first reference switch REF411 and the second reference switch REF412 are turned on and off in opposite phases, and when the second auto-zero switch AZ412 is turned on, the output level of the amplifier 413 is reset to the reference potential.

<Wider Output Range with Bias>

In the fifth embodiment, the switch REF411 is connected between the amplifier output VAMP and the reference potential VREF. When the first auto-zero switch AZ411 is turned on by the control signal ΦAZ, the amplifier output VAMP is reset to the reference potential VREF (<VB). Thus, the minimum voltage of the amplifier output VAMP is lowered, and the output range of the amplifier 411, which is an inverting amplifier, can be expanded.

In addition to the above advantage of the expansion of the output range of the amplifier 411, the fifth embodiment can produce the same effects as the above-described first embodiment.

Sixth Embodiment

Figure 17:
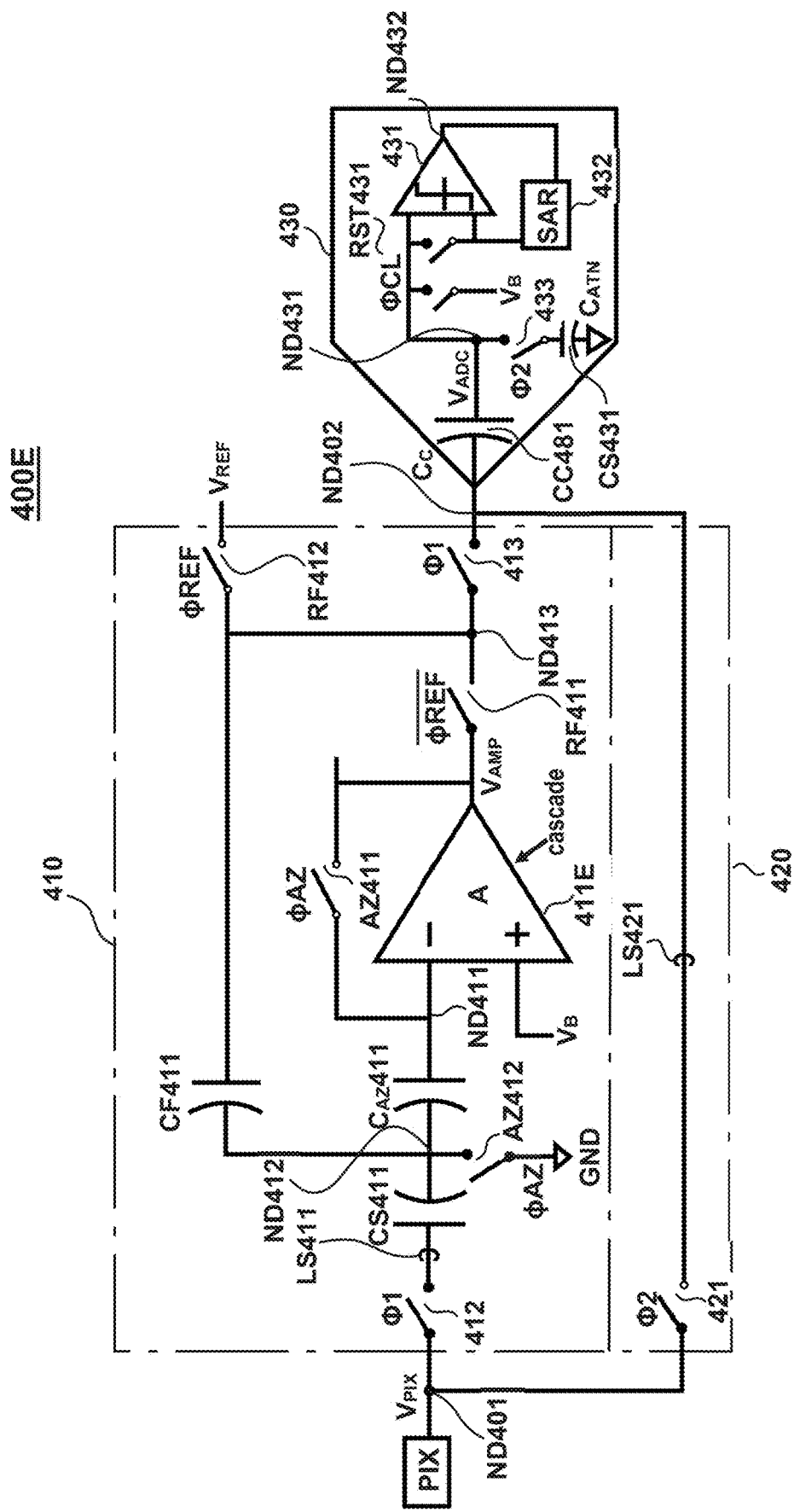
FIG. 17 is a circuit diagram showing an example configuration of main parts of a pixel signal processing part relating to a sixth embodiment of the present disclosure.

FIG. 17 is a circuit diagram showing an example configuration of main parts of a pixel signal processing part according to the sixth embodiment of the present disclosure.

A pixel signal processing part 400E relating to the sixth embodiment differs from the pixel signal processing part 400D relating to the fifth embodiment in terms of the following points.

In the pixel signal processing unit 400D of the fifth embodiment, the configuration of amplifier 411, which is an inverting amplifier, is not specified. In contrast, in the pixel signal processing section 400E of this sixth embodiment, the configuration of the amplifier 411E made of the inverting amplifier is specified as a cascode type.

<Reduction of Column FPN>

This configuration of the amplifier 411E consisting of the inverting amplifier of the cascode type is applicable to the fourth and fifth embodiments described above. By adopting the cascode structure, the output range of the inverting amplifier is reduced, but the open-loop DC gain is increased and the gain error expressed as the following Formula 1 is reduced. With a smaller gain error, the column-fixed pattern noise (FPN) of the bright signal can be reduced.

Gain error (when $V_B = 0$) [Formula 1]

$$V_{OUT} = \frac{C_S}{C_F} \frac{1}{1 + \frac{C_S + C_F}{A \cdot C_F}} (V_R - V_S)$$

$$\text{error} = \left(1 - \frac{1}{1 + \frac{C_S + C_F}{A \cdot C_F}}\right) \frac{C_S}{C_F} (V_R - V_S) = \frac{1}{1 + A\frac{C_F}{C_S + C_F}} \frac{C_S}{C_F} (V_R - V_S)$$

Figure 18:
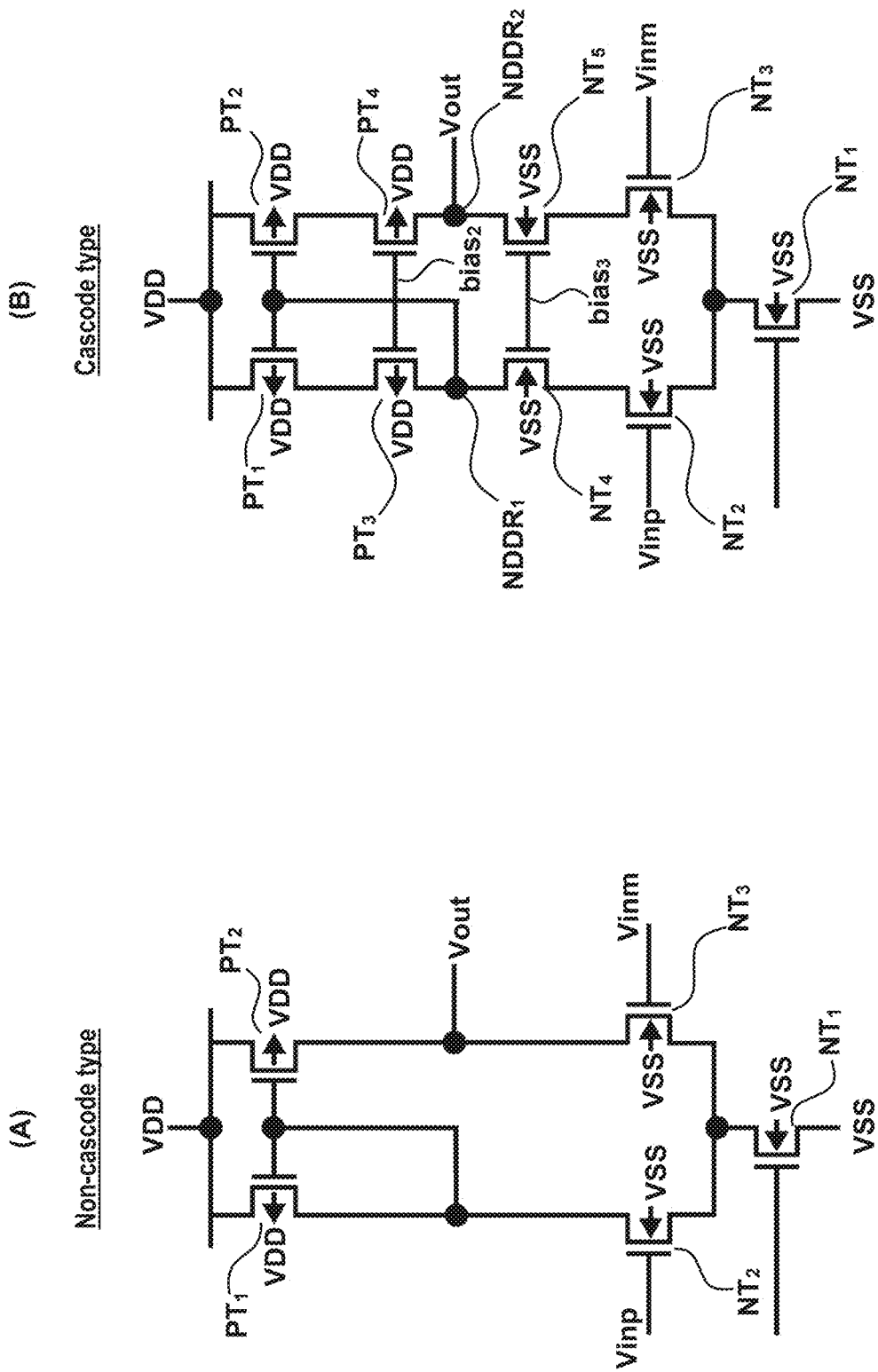
FIG. 18 shows a circuit configuration of a cascode type inverting amplifier together with a comparative example thereof.

An example circuit configuration of the cascode type inverting amplifier is illustrated in FIG. 18. Part (A) of FIG. 18 shows a circuit configuration of a basic inverting amplifier as a comparative example, and part (B) of FIG. 18B shows an example circuit configuration of the cascode type inverting amplifier.

The cascode type inverting amplifier AMP of part (B) of FIG. 18 includes PMOS transistors PT1 to PT4 and NMOS transistors NT1 to NT5. In the amplifier AMP, the PMOS transistor PT3 is connected between the drain of PMOS transistor PT1 and a first drain node NDDR1, and the PMOS transistor PT4 is connected between the drain of PMOS transistor PT2 and a second drain node NDDR2. The gate of the PMOS transistor PT3 and the gate of PMOS transistor PT4 are connected to a bias potential bias2. The NMOS transistor NT4 is connected between the first drain node NDDR1 and the low impedance side node of a non-inverting input terminal 411P, and the NMOS transistor NT5 is connected between the second drain node NDDR2 and the low impedance side node of an inverting input terminal 411N. The gates of the NMOS transistors NT4 and NT5 are connected to a bias potential bias1.

According to the sixth embodiment, in addition to the advantage of reducing the column-fixed pattern noise (FPN) of the bright signal, the same effects as those of the first and fifth embodiments described above can be obtained.

The solid-state imaging devices 10 and 10A to 10E described above can be applied, as an imaging device, to electronic apparatuses such as digital cameras, video cameras, mobile terminals, surveillance cameras, and medical endoscope cameras.

Figure 19:
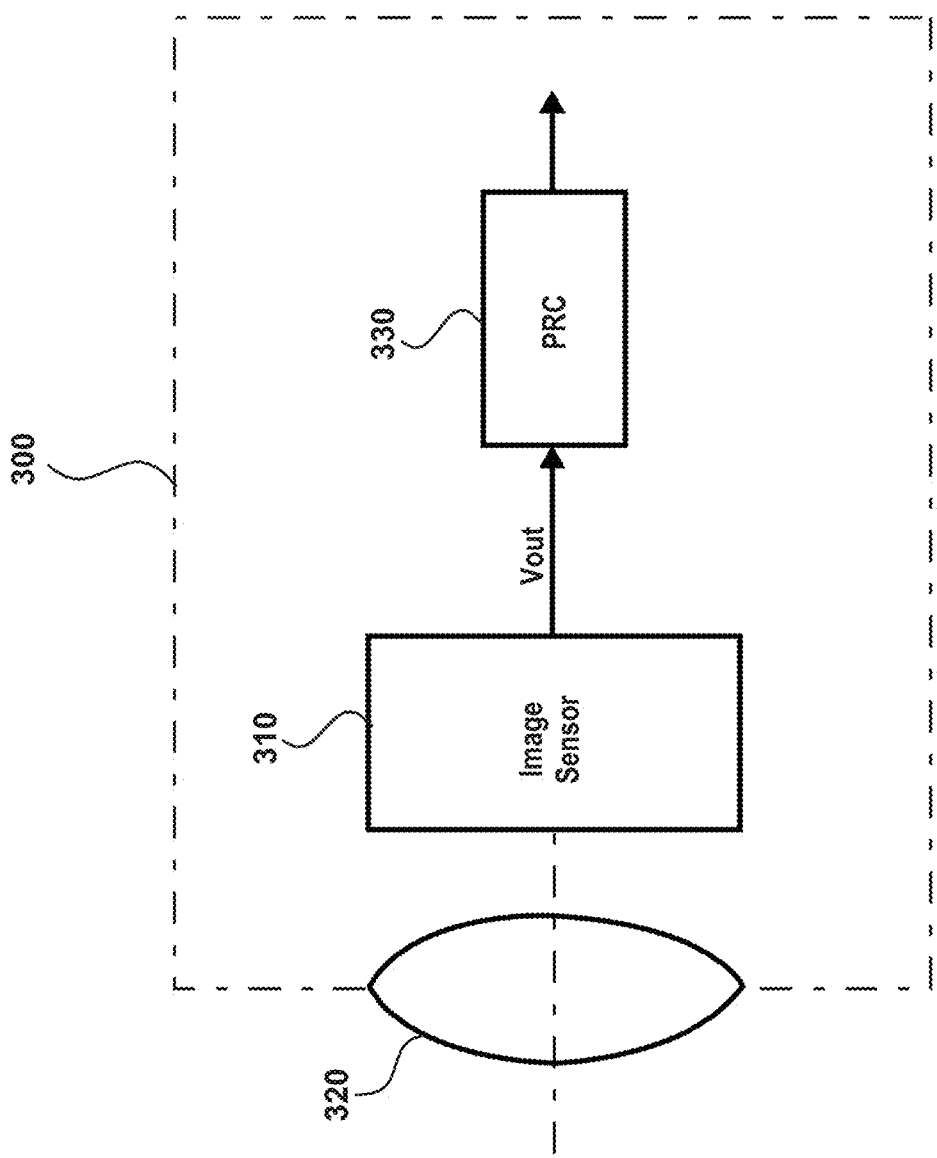
FIG. 19 shows an example configuration of an electronic apparatus to which the solid-state imaging devices relating to the embodiments of the present disclosure can be applied.

FIG. 19 shows an example configuration of an electronic apparatus including a camera system to which the solid-state imaging devices according to the embodiments of the present disclosure can be applied.

As shown in FIG. 19, the electronic apparatus 300 includes a CMOS image sensor 310 that can be constituted by any of the solid-state imaging devices 10, 10A, 10B, 10C, 10D, and 10E relating to the embodiments of the present disclosure. The electronic apparatus 300 further includes an optical system (such as a lens) 320 for redirecting the incident light to the pixel region of the CMOS image sensor 310 (to form a subject image). The electronic apparatus 300 includes a signal processing circuit (PRC) 330 for processing output signals of the CMOS image sensor 310.

The signal processing circuit 330 performs predetermined signal processing on the output signals from the CMOS image sensor 310. The image signals processed in the signal processing circuit 330 can be handled in various manners. For example, the image signals can be displayed as a video image on a monitor having a liquid crystal display, or the image signals can be printed by a printer or recorded directly on a storage medium such as a memory card.

As described above, a high-performance, compact, and low-cost camera system can be provided that includes the above-described solid-state imaging device 10, 10A, 10B, 10C, 10D, 10E, or 10F as the CMOS image sensor 310. Accordingly, the embodiments of the present disclosure can provide for electronic apparatuses such as surveillance cameras and medical endoscope cameras, which are used for applications where the cameras are installed under restricted conditions from various perspectives such as the installation size, the number of connectable cables, the length of cables and the installation height.

What is claimed is:

1. A solid-state imaging device comprising:
   a readable pixel adapted to produce a plurality of read-out signals as a pixel signal, each of the plurality of read-out signals being formed of a signal at a reference level and a signal at a signal level;
   a pixel signal processing part for processing the pixel signal read out from the readable pixel,
   wherein the pixel signal processing part includes:
     an input node for receiving the pixel signal read out from the readable pixel input thereto;
     a connection node connected to a next-stage circuit;
     an operational amplifier having an inverting input terminal and a non-inverting input terminal;
     a first node connected to the non-inverting input terminal of the operational amplifier;
     a second node;
     a third node connected to an output terminal of the operational amplifier and the connection node;
     a first auto-zero switch connected between the third node and the first node;
     an auto-zero capacitor connected between the first node and the second node;
     a second auto-zero switch connected between the second node and a predetermined bias potential, the second auto-zero switch being turned on and off in phase with the first auto-zero switch;
     a feedback capacitor connected between the third node and the second node; and
     a sampling capacitor connected between the second node and the input node,
   wherein the first auto-zero switch and the second auto-zero switch are kept in ON state during an auto-zero period including a reset function.

2. The solid-state imaging device of claim 1, wherein, in the pixel signal processing part,
   the first auto-zero switch and the second auto-zero switch are kept in ON state to connect the second node to the bias potential, so that the sampling capacitor, the feedback capacitor, and the auto-zero capacitor are operated in respective operation ranges of the capacitors, and the feedback capacitor is kept constant according to a difference of the input pixel signals, thereby making output of the operational amplifier in linear response to an input signal.

3. The solid-state imaging device of claim 1, wherein the pixel signal processing part further includes:
   a first input switch connected in series with the sampling capacitor between the input node and the second node; and
   an output switch connected between the third node and the connection node,
   wherein the first input switch and the output switch are turned on and off in phase,
   wherein when the first input switch and the output switch are ON, the first auto-zero switch and the second auto-zero switch are kept in ON state to connect the second node to the bias potential, so that the sampling capacitor, the feedback capacitor, and the auto-zero capacitor are operated in respective operation ranges of the capacitors, and the feedback capacitor is kept constant according to a difference of the input pixel signals, thereby making output of the operational amplifier in linear response to an input signal.

4. The solid-state imaging device of claim 2, wherein capacitance of the auto-zero capacitor is smaller than capacitance of the sampling capacitor.

5. The solid-state imaging device of claim 4, wherein the pixel signal processing part does not include:
   a first input switch connectible in series with the sampling capacitor between the input node and the second node; and
   an output switch connectible between the third node and the connection node and adapted to be turned on and off in phase with the first input switch,
   wherein the pixel signal processing part further includes a second input switch that is connected between the input node and the connection node and adapted to be turned on and off in opposite phase with the first input switch and the output switch,
   wherein the operational amplifier is turned off during a period when the second input switch is ON, and
   wherein parasitic load capacitance of the operational amplifier is small since the sampling capacitor and the feedback capacitor having large capacitances appear small with a small capacitance of the serialized auto-zero capacitor and a capacitance of the operational amplifier.

6. The solid-state imaging device of claim 4, wherein the bias potential is a ground or positive bias potential.

7. The solid-state imaging device of claim 4, wherein the first auto-zero switch is formed of a series switch in which a plurality of switches are connected in series.

8. The solid-state imaging device of claim 4, wherein a charge injection capacitor is connected to a connection line between the first auto-zero switch and the first node to inject charge into the connection line when the first auto-zero switch is turned off.

9. The solid-state imaging device of claim 8, wherein the operational amplifier is a cascode type.

10. The solid-state imaging device of claim 4, further comprising:
    a fourth node formed on a signal input line of the output switch;
    the first auto-zero switch connected between the third node and the first node;
    a first reference switch connected between the fourth node and the third node coupled to the output terminal of the operational amplifier;
    the feedback capacitor connected between the forth node and the second node;
    a second reference switch connected between a reference potential and a line that connects the feedback capacitor and the fourth node,
    wherein the first reference switch and the second reference switch are turned on and off in opposite phases, and wherein when the second auto-zero switch is turned on, output level of the operational amplifier is reset to the reference potential.

11. The solid-state imaging device of claim 10, wherein the operational amplifier is a cascode type.

12. The solid-state imaging device of claim 1, wherein the readable pixel is adapted to perform photoelectric conversion and produce, as a readable pixel signal, a first-conversion-gain signal and a second-conversion-gain signal corresponding to at least two conversion gains and having opposite signal directions, wherein the pixel signal processing part includes:
  a first reading part for inverting a signal direction of the first-conversion-gain signal of the pixel signal input into the input node and outputting an inverted first-conversion-gain signal to the connection node; and
  a second reading part for keeping a signal direction of the second-conversion-gain signal of the pixel signal input into the input node unchanged and outputting a non-inverted second-conversion-gain signal to the connection node.

13. The solid-state imaging device of claim 12, wherein, in the first reading part, the non-inverting input terminal of the operational amplifier is connectable to the bias potential.

14. The solid-state imaging device of claim 12, wherein the first reading part includes a first input switch connected in series with the sampling capacitor between the second node and the input node, wherein the first input switch is kept in a conduction state in a first-conversion-gain signal read-out mode, and wherein the second reading part includes a second input switch connected between the input node and the connection node, and wherein the second input switch is kept in a conduction state in a second-conversion-gain signal read-out mode.

15. A method for driving a solid-state imaging device, the solid-state imaging device including:

readable pixel adapted to produce a plurality of read-out signals as a pixel signal, each of the plurality of read-out signals being formed of a signal at a reference level and a signal at a signal level; and a pixel signal processing part for processing the pixel signal read out from the readable pixel, wherein the pixel signal processing part includes:
  an input node for receiving the pixel signal read out from the readable pixel input thereto;
  a connection node connected to a next-stage circuit;
  an operational amplifier having an inverting input terminal and a non-inverting input terminal;
  a first node connected to the non-inverting input terminal of the operational amplifier;
  a second node;
  a third node connected to an output terminal of the operational amplifier and the connection node;
  a first auto-zero switch connected between the third node and the first node;
  an auto-zero capacitor connected between the first node and the second node;
  a second auto-zero switch connected between the second node and a predetermined bias potential, the second auto-zero switch being turned on and off in phase with the first auto-zero switch;
  a feedback capacitor connected between the third node and the second node; and
  a sampling capacitor connected between the second node and the input node, wherein the first auto-zero switch and the second auto-zero switch are kept in ON state during an auto-zero period including a reset function, the method comprising:

operating the sampling capacitor, the feedback capacitor, and the auto-zero capacitor in respective operation ranges of the capacitors by holding the first auto-zero switch and the second auto-zero switch in ON state to connect the second node to the bias potential; and making output of the operational amplifier in linear response to an input signal by keeping the feedback capacitor constant according to a difference of the input pixel signal.

16. An electronic apparatus comprising:

a solid-state imaging device; and an optical system for forming a subject image on the solid-state imaging device, wherein the solid-state imaging device includes:
  a readable pixel adapted to produce a plurality of read-out signals as a pixel signal, each of the plurality of read-out signals being formed of a signal at a reference level and a signal at a signal level;
  a pixel signal processing part for processing the pixel signal read out from the readable pixel, wherein the pixel signal processing part includes:
  an input node for receiving the pixel signal read out from the readable pixel input thereto;
  a connection node connected to a next-stage circuit;
  an operational amplifier having an inverting input terminal and a non-inverting input terminal;
  a first node connected to the non-inverting input terminal of the operational amplifier;
  a second node;
  a third node connected to an output terminal of the operational amplifier and the connection node;
  a first auto-zero switch connected between the third node and the first node;
  an auto-zero capacitor connected between the first node and the second node;
  a second auto-zero switch connected between the second node and a predetermined bias potential, the second auto-zero switch being turned on and off in phase with the first auto-zero switch;
  a feedback capacitor connected between the third node and the second node; and
  a sampling capacitor connected between the second node and the input node, wherein the first auto-zero switch and the second auto-zero switch are kept in ON state during an auto-zero period including a reset function.

* * * * *